United States Patent
Tang et al.

(10) Patent No.: US 12,464,038 B2
(45) Date of Patent: Nov. 4, 2025

(54) PUBLIC CLOUD SYSTEM AND RELATED METHOD THEREOF

(71) Applicant: Huawei Cloud Computing Technologies Co., Ltd., Guizhou (CN)

(72) Inventors: Deping Tang, Chengdu (CN); Javier Picorel, Munich (DE); Huatao Wu, Chengdu (CN)

(73) Assignee: HUAWEI CLOUD COMPUTING TECHNOLOGIES CO., LTD., Guizhou (CN)

( * ) Notice: Subject to any disclaimer, the term of this patent is extended or adjusted under 35 U.S.C. 154(b) by 9 days.

(21) Appl. No.: 18/658,733

(22) Filed: May 8, 2024

(65) Prior Publication Data

US 2024/0357003 A1 Oct. 24, 2024

Related U.S. Application Data

(63) Continuation of application No. PCT/CN2022/130279, filed on Nov. 7, 2022.

(30) Foreign Application Priority Data

Nov. 8, 2021 (CN) .......................... 202111312998.5
Feb. 28, 2022 (CN) .......................... 202210189538.6

(51) Int. Cl.
*H04L 67/06* (2022.01)
*H04L 67/10* (2022.01)

(52) U.S. Cl.
CPC ............. *H04L 67/06* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2014/0101310 A1* | 4/2014 | Savage | H04W 4/60 709/224 |
| 2014/0279846 A1* | 9/2014 | Srinivasan | G06Q 10/107 707/608 |

(Continued)

FOREIGN PATENT DOCUMENTS

| | | |
|---|---|---|
| CN | 108197493 A | 6/2018 |
| CN | 111897564 A | 11/2020 |
| CN | 112513816 A | 3/2021 |

OTHER PUBLICATIONS

Dudouet et al., "A case for CDN-as-a-service in the cloud: A Mobile Cloud Networking argument", Sep. 1, 2014, IEEE, 2014 International Conference on Advances in Computing, Communications and Informatics (ICACCI) (2014, pp. 651-657) (Year: 2014).*

*Primary Examiner* — Davoud A Zand
(74) *Attorney, Agent, or Firm* — Conley Rose, P.C.

(57) ABSTRACT

A public cloud system includes a cloud storage service apparatus configured to store an object file, and a cloud function service apparatus configured to obtain an objective function, wherein the objective function is data processing logic defined by a tenant for the object file. The cloud storage service apparatus is further configured to, when receiving a download request for the object file from a first client, send the object file to the cloud function service apparatus. The cloud function service apparatus is further configured to run the objective function to process the object file based on the data processing logic, and return a processed file to the cloud storage service apparatus. The cloud storage service apparatus is further configured to send the processed file to the first client.

20 Claims, 10 Drawing Sheets

(56) References Cited

U.S. PATENT DOCUMENTS

| | | | |
|---|---|---|---|
| 2015/0244778 A1* | 8/2015 | Zhang | G06F 21/6218 709/203 |
| 2017/0331892 A1* | 11/2017 | Crofton | H04L 67/06 |
| 2019/0227978 A1 | 7/2019 | Guim Bernat et al. | |
| 2020/0134030 A1 | 4/2020 | Natanzon et al. | |
| 2020/0341690 A1 | 10/2020 | Saad et al. | |

* cited by examiner

PUBLIC CLOUD SYSTEM AND RELATED METHOD THEREOF

CROSS-REFERENCE TO RELATED APPLICATIONS

This is a continuation of International Patent Application No. PCT/CN2022/130279 filed on Nov. 7, 2022, which claims priority to Chinese Patent Application No. 202111312998.5 filed on Nov. 8, 2021 and Chinese Patent Application No. 202210189538.6 filed on Feb. 28, 2022, all of which are hereby incorporated by reference in their entireties.

TECHNICAL FIELD

This disclosure relates to the field of cloud technologies, and in particular, to a public cloud system and a related method thereof.

BACKGROUND

Cloud storage is a new network storage technology extended and developed based on a concept of cloud computing. This technology allows a large number of virtualized storage resources to be deployed on a plurality of servers, to store data of a large number of users. Data obtained by the user from these servers is usually data obtained through processing. Therefore, enabling the server to have a data processing capability becomes a new requirement.

Currently, a public cloud system includes a function-as-a-service (FAAS) module (which may also be referred to as a cloud function service apparatus), a cloud storage service apparatus, and a gateway. Usually, the user may send, to the gateway via a client, a request indicating a file, so that the gateway sends, to the cloud function service apparatus, a request indicating a function. Then, based on the request, the cloud function service apparatus may obtain, from the cloud storage service apparatus, an original file required by the user, and call the function to process the file. Finally, the cloud function service apparatus sends a processed file to the gateway, so that the gateway returns the processed file to the client for use by the user.

In the foregoing process, an input/output (I/O) path for end-to-end transmission of the file is excessively long, which results in a high data transmission latency. In a service scenario that is sensitive to the data transmission latency, a requirement of the user usually cannot be met.

SUMMARY

Embodiments of this disclosure provide a public cloud system and a related method thereof, so that an I/O path for file transmission can be shortened, and a data transmission latency can be reduced. Therefore, in a service scenario that is sensitive to the data transmission latency, a requirement of a user can be met.

A first aspect of embodiments of this disclosure provides a public cloud system. The public cloud system includes a cloud storage service apparatus and a cloud function service apparatus.

When a first tenant needs to obtain a processed object file, the first tenant may log in to a cloud management platform in the public cloud system via a first client, to access the cloud storage service apparatus and the cloud function service apparatus via the cloud management platform, and implement communication with the cloud storage service apparatus and the cloud function service apparatus. For example, after the first tenant logs in to the cloud management platform by using a mobile phone, the cloud management platform may be presented as a user interface on the mobile phone of the tenant, and display a trigger area of a cloud function service and a trigger area of a cloud storage service on the user interface. Therefore, the mobile phone of the first tenant may jump to the cloud function service apparatus and the cloud storage service apparatus in the corresponding trigger areas, to implement communication with the two modules.

In this case, the first tenant may first send a download request for an object file to the cloud storage service apparatus via the first client used by the first tenant. After receiving the download request, the cloud storage service apparatus may determine, based on the download request, that the first client needs the processed object file. Therefore, the cloud storage service apparatus may send the object file to the cloud function service apparatus.

Because the cloud function service apparatus has an objective function, and the objective function may be understood as data processing logic defined by the tenant for the object file, the cloud function service apparatus may run the objective function, to process the object file based on the data processing logic, and obtain the processed object file. For example, after the cloud storage service apparatus sends original image data to the cloud function service apparatus, the cloud function service apparatus may process the original image data based on a function corresponding to compression processing, to obtain processed image data.

Finally, the cloud function service apparatus returns the processed object file to the cloud storage service apparatus, so that the cloud storage service apparatus sends, to the first client for use by the first tenant, the processed object file as a download response.

It may be learned from the public cloud system that the object file may be directly transmitted between the cloud function service apparatus and the cloud storage service apparatus, that is, the cloud storage service apparatus may directly send the object file to the cloud function service apparatus, and the cloud function service apparatus may directly send the processed object file to the cloud storage service apparatus. An I/O path for object file transmission does not pass through a gateway. In comparison with another technology, the I/O path for object file transmission can be effectively shortened, and a data transmission latency can be reduced. Therefore, in a service scenario that is sensitive to the data transmission latency, a requirement of the tenant can be met.

In a possible implementation, because the data processing logic is defined by the tenant based on the requirement of the tenant, the data processing logic may be presented in a plurality of manners: (1) If the data processing logic is data encryption logic, the cloud function service apparatus may perform encryption processing on the object file based on the data encryption logic, and the processed object file may be considered as an encrypted object file. (2) If the data processing logic is data decryption logic, the cloud function service apparatus may perform decryption processing on the object file based on the data encryption logic, and the processed object file may be considered as a decrypted object file. (3) If the data processing logic is data compression logic, the cloud function service apparatus may perform compression processing on the object file based on the data compression logic, and the processed object file may be considered as a compressed object file. (4) If the data processing logic is data decompression logic, the cloud function service apparatus may perform decompression processing on the object file based on the data decompression logic, and the processed object file may be considered as a decompressed object file. (5) If the data processing logic is data format conversion logic, the cloud function service apparatus may perform format conversion processing on the object file based on the data format conversion logic, and the processed object file may be considered as an object file obtained through format conversion. (6) If the data processing logic is data content transformation logic, the cloud function service apparatus may perform content transformation processing on the object file based on the data format conversion logic, and the processed object file may be considered as an object file obtained through content transformation. (7) If the data processing logic is data filtering logic, the cloud function service apparatus may perform content transformation processing on the object file based on data format filtering, and the processed object file may be considered as a filtered object file.

In a possible implementation, that the cloud storage service apparatus stores the object file includes: The cloud storage service apparatus receives and stores the object file uploaded by the first client used by the first tenant or a second client used by a second tenant.

In a possible implementation, the public cloud system further includes the cloud management platform, and the cloud management platform is configured to provide a registration interface. The registration interface is configured to obtain an account and a password that are entered by the first tenant, and the cloud management platform registers the first tenant based on the account and the password of the first tenant, so that the first client is capable of communicating with a storage service module and the cloud function service apparatus based on the account and the password of the first tenant. The registration interface is further configured to obtain an account and a password that are entered by the second tenant, and the cloud management platform registers the second tenant based on the account and the password of the second tenant, so that the second client is capable of communicating with the storage service module and the cloud function service apparatus based on the account and the password of the second tenant. In the foregoing implementation, the cloud management platform may be oriented to the tenant and provide the registration interface. The registration interface may obtain the account and the password that are entered by the tenant, so that the cloud management platform registers the tenant based on the account of the tenant and the password of the tenant. After registration is completed, the tenant may log in to, via the client used by the tenant, the cloud management platform by using the account and the password of the tenant, to access the cloud storage service apparatus and the cloud function service apparatus via the cloud management platform, and implement communication with the cloud storage service apparatus and the cloud function service apparatus.

In a possible implementation, that the cloud storage service apparatus sends the object file to the cloud function service apparatus includes: The cloud function service apparatus sends a first Internet protocol (IP) address of the cloud function service apparatus and a first port of the cloud function service apparatus to the cloud storage service apparatus. The cloud storage service apparatus establishes a target channel with the cloud function service apparatus based on the first IP address and the first port. The cloud storage service apparatus sends the object file to the cloud function service apparatus over the target channel. In the foregoing implementation, the cloud function service apparatus may notify the cloud storage service apparatus of the first IP address and the first port of the cloud function service apparatus. Therefore, the cloud storage service apparatus may establish the target channel with the cloud function service apparatus based on the first IP address and the first port. After the target channel is established, because the cloud storage service apparatus has determined the object file required for implementing the objective function, the cloud storage service apparatus may directly send the object file to the cloud function service apparatus over the target channel.

In a possible implementation, that the cloud function service apparatus sends a first IP address of the cloud function service apparatus and a first port of the cloud function service apparatus to the cloud storage service apparatus includes: The cloud storage service apparatus sends a call request to the cloud function service apparatus. The call request is generated based on the download request. The call request indicates the objective function. The cloud storage service apparatus receives, from the cloud function service apparatus, a call response for the call request. The call response indicates the first IP address of the cloud function service apparatus and the first port of the cloud function service apparatus. In the foregoing implementation, after obtaining the download request, the cloud storage service apparatus may generate the call request based on the download request and send the call request to the cloud function service apparatus. The call request indicates the objective function. After obtaining the call request, the cloud function service apparatus may return, to the cloud storage service apparatus, the call response obtained by processing the call request, to notify the cloud storage service apparatus of the first IP address and the first port of the cloud function service apparatus, and establish the target channel between the cloud function service apparatus and the cloud storage service apparatus.

In a possible implementation, that the cloud storage service apparatus sends the object file to the cloud function service apparatus includes: The cloud storage service apparatus sends a second IP address of the cloud storage service apparatus and a second port of the cloud storage service apparatus to the cloud function service apparatus. The cloud function service apparatus establishes a target channel with the cloud storage service apparatus based on the second IP address and the second port. The cloud storage service apparatus sends the object file to the cloud function service apparatus over the target channel. In the foregoing implementation, the cloud storage service apparatus may notify the cloud function service apparatus of the second IP address and the second port of the cloud storage service apparatus. Therefore, the cloud function service apparatus may establish the target channel with the cloud storage service apparatus based on the second IP address and the second port. After the target channel is established, because the cloud storage service apparatus has determined the object file required for implementing the objective function, the cloud storage service apparatus may directly send the object file to the cloud function service apparatus over the target channel.

In a possible implementation, that the cloud storage service apparatus sends a second IP address of the cloud storage service apparatus and a second port of the cloud storage service apparatus to the cloud function service apparatus includes: The cloud storage service apparatus sends a call request to the cloud function service apparatus. The call request is generated based on the download request. The call request indicates the objective function, the second IP address of the cloud storage service apparatus, and the second port of the cloud storage service apparatus. In the foregoing implementation, after obtaining the download request, the cloud storage service apparatus may generate the call request based on the download request and send the call request to the cloud function service apparatus. The call request indicates the objective function, the second IP address of the cloud storage service apparatus, and the second port of the cloud storage service apparatus. After obtaining the call request, the cloud function service apparatus may determine the second IP address and the second port of the cloud storage service apparatus, to establish the target channel between the cloud function service apparatus and the cloud storage service apparatus.

In a possible implementation, that the call request is generated based on the download request includes: If the download request indicates the object file and the objective function, the call request is generated based on the download request. If the download request indicates the object file, the call request is generated based on the download request and a preset rule, and the rule is a correspondence between data and a function. In the foregoing implementation, when the tenant needs to obtain the processed object file, the tenant may send the download request to the cloud storage service apparatus via the client. If the download request may indicate the object file and the objective function, the cloud storage service apparatus may first parse the call request, and may determine, based on information obtained through parsing, that the tenant needs to use the objective function to process the object file. Therefore, the cloud storage service apparatus may generate the call request indicating the objective function. If the call request only indicates the object file, the cloud storage service apparatus may first parse the call request, and may determine, based on information obtained through parsing, that the tenant needs to process the object file. As for a function the tenant wants to use to process the object file, the cloud storage service apparatus may determine, in the preset rule, the objective function corresponding to the object file. Finally, the cloud storage service apparatus may generate the call request indicating the objective function. In this way, the cloud storage service apparatus may use the call request to trigger data transmission between the cloud storage service apparatus and the cloud function service apparatus.

In a possible implementation, that the cloud function service apparatus returns the processed object text to the cloud storage service apparatus includes: The cloud function service apparatus returns the processed object text to the cloud storage service apparatus over the target channel.

In a possible implementation, the target channel is a Hypertext Transfer Protocol (HTTP)-based communication channel, a Transmission Control Protocol (TCP)-based communication channel, a WebSocket protocol-based communication channel, or a remote procedure call (RPC) protocol-based communication channel.

A second aspect of embodiments of this disclosure provides a public cloud system. The public cloud system includes a cloud storage service apparatus and a cloud function service apparatus.

When a first tenant needs to obtain a processed object file, the first tenant may log in to a cloud management platform in the public cloud system via a first client, to access the cloud storage service apparatus and the cloud function service apparatus via the cloud management platform, and implement communication with the cloud storage service apparatus and the cloud function service apparatus. For example, after the first tenant logs in to the cloud management platform by using a mobile phone, the cloud management platform may be presented as a user interface on the mobile phone of the tenant, and display a trigger area of a cloud function service and a trigger area of a cloud storage service on the user interface. Therefore, the mobile phone of the first tenant may jump to the cloud function service apparatus and the cloud storage service apparatus in the corresponding trigger areas, to implement communication with the two modules.

In this case, the first tenant may first send a write request for an object file to the cloud storage service apparatus via the first client used by the first tenant. After receiving the write request, the cloud storage service apparatus may determine, based on the write request, that the first client needs to write data into the object file. Therefore, the cloud storage service apparatus may send to-be-written data carried in the write request to the cloud function service apparatus.

Because the cloud function service apparatus has an objective function, and the objective function may be understood as data processing logic defined by the tenant for the object file, the cloud function service apparatus may run the objective function, to process the to-be-written data based on the data processing logic, and obtain processed data. For example, after the cloud storage service apparatus sends, to the cloud function service apparatus, a text to be added to the object document, the cloud function service apparatus may process the text based on a function corresponding to encryption processing, to obtain an encrypted text.

Finally, the cloud function service apparatus returns the processed data to the cloud storage service apparatus, so that the cloud storage service apparatus writes the processed data into the object file to complete updating of the object file. Still as in the foregoing example, after obtaining the encrypted text from the cloud function service apparatus, the cloud function service apparatus may write the encrypted text into the object document.

It can be learned from the foregoing method that the to-be-written data may be directly transmitted between the cloud function service apparatus and the cloud storage service apparatus, that is, the cloud storage service apparatus may directly send the to-be-written data to the cloud function service apparatus, and the cloud function service apparatus may directly send the processed data to the cloud storage service apparatus. An I/O path for object file transmission does not pass through a gateway. In comparison with another technology, the I/O path for object file transmission can be effectively shortened, and a data transmission latency can be reduced. Therefore, in a service scenario that is sensitive to the data transmission latency, a requirement of the tenant can be met.

In a possible implementation, the data processing logic is data encryption logic, and processing is encryption processing; or the data processing logic is data decryption logic, and processing is decryption processing; or the data processing logic is data compression logic, and processing is compression processing; or the data processing logic is data decompression logic, and processing is decompression processing; or the data processing logic is data format conversion logic, and processing is format conversion processing; or the data processing logic is data content transformation logic, and processing is content transformation processing; or the data processing logic is data filtering logic, and processing is filtering processing.

In a possible implementation, that the cloud storage service apparatus stores the object file includes: The cloud storage service apparatus receives and stores the object file uploaded by the first client or a second client.

In a possible implementation, the public cloud system further includes the cloud management platform, and the method further includes: The cloud management platform provides a registration interface. The registration interface is configured to obtain an account and a password that are entered by the first tenant, and the cloud management platform registers the first tenant based on the account and the password of the first tenant, so that the first client is capable of communicating with a storage service module and the cloud function service apparatus based on the account and the password of the first tenant. The registration interface is further configured to obtain an account and a password that are entered by a second tenant, and the cloud management platform registers the second tenant based on the account and the password of the second tenant, so that the second client is capable of communicating with the storage service module and the cloud function service apparatus based on the account and the password of the second tenant.

In a possible implementation, that the cloud storage service apparatus sends the to-be-written data to the cloud function service apparatus includes: The cloud function service apparatus sends a first IP address of the cloud function service apparatus and a first port of the cloud function service apparatus to the cloud storage service apparatus. The cloud storage service apparatus establishes a target channel with the cloud function service apparatus based on the first IP address and the first port. The cloud storage service apparatus sends the to-be-written data to the cloud function service apparatus over the target channel.

In a possible implementation, that the cloud storage service apparatus sends the to-be-written data to the cloud function service apparatus includes: The cloud storage service apparatus sends a second IP address of the cloud storage service apparatus and a second port of the cloud storage service apparatus to the cloud function service apparatus. The cloud function service apparatus establishes a target channel with the cloud storage service apparatus based on the second IP address and the second port. The cloud storage service apparatus sends the to-be-written data to the cloud function service apparatus over the target channel.

In a possible implementation, that the cloud function service apparatus sends a first IP address of the cloud function service apparatus and a first port of the cloud function service apparatus to the cloud storage service apparatus includes: The cloud storage service apparatus sends a call request to the cloud function service apparatus. The call request is generated based on the write request. The call request indicates the objective function. The cloud storage service apparatus receives, from the cloud function service apparatus, a call response for the call request. The call response indicates the first IP address of the cloud function service apparatus and the first port of the cloud function service apparatus.

In a possible implementation, that the cloud storage service apparatus sends a second IP address of the cloud storage service apparatus and a second port of the cloud storage service apparatus to the cloud function service apparatus includes: The cloud storage service apparatus sends a call request to the cloud function service apparatus. The call request is generated based on the write request. The call request indicates the objective function, the second IP address of the cloud storage service apparatus, and the second port of the cloud storage service apparatus.

In a possible implementation, that the call request is generated based on the write request includes: If the write request indicates the object file and the objective function, the call request is generated based on the write request. If the write request indicates the object file, the call request is generated based on the write request and a preset rule, and the rule is a correspondence between data and a function.

In a possible implementation, that the cloud function service apparatus returns the processed data to the cloud storage service apparatus includes: The cloud function service apparatus returns the processed data to the cloud storage service apparatus over the target channel.

In a possible implementation, the target channel is an HTTP-based communication channel, a TCP-based communication channel, a WebSocket protocol-based communication channel, or an RPC protocol-based communication channel.

A third aspect of embodiments of this disclosure provides a file download method based on a public cloud technology, and the method includes: A cloud storage service apparatus stores an object file, and provides a file download interface, where the file download interface is configured to receive a download request and an objective function that are for the object file and that are sent by a client, and the objective function is data processing logic defined by a tenant for the object file. The cloud storage service apparatus sends the object file and the objective function to a cloud function service apparatus. The cloud storage service apparatus receives a processed file sent by the cloud function service apparatus, wherein the processed file is generated by running the objective function to perform the data processing logic to the object file by the cloud function service apparatus. The cloud storage service apparatus sends the processed file to the client.

In a possible implementation, the data processing logic is data encryption logic, and processing is encryption processing; or the data processing logic is data decryption logic, and processing is decryption processing; or the data processing logic is data compression logic, and processing is compression processing; or the data processing logic is data decompression logic, and processing is decompression processing; or the data processing logic is data format conversion logic, and processing is format conversion processing; or the data processing logic is data content transformation logic, and processing is content transformation processing; or the data processing logic is data filtering logic, and processing is filtering processing.

In a possible implementation, that a cloud storage service apparatus stores an object file includes: The cloud storage service apparatus receives and stores the object file uploaded by a first client or a second client.

A fourth aspect of embodiments of this disclosure provides a file update method based on a public cloud technology, and the method includes: a cloud storage service apparatus stores an object file, and provides a file update interface, where the file download interface is configured to receive a write request and an objective function that are for the object file and that are sent by a client, and the objective function is data processing logic defined by a tenant for the object file. The cloud storage service apparatus sends to-be-written data carried in the write request and the objective function to a cloud function service apparatus. The cloud storage service apparatus receives processed data sent by the cloud function service apparatus, wherein the processed data is generated by running the objective function to perform the data processing logic to the to-be-written data by the cloud function service apparatus. The cloud storage service apparatus writes the processed data into the object file.

In a possible implementation, the data processing logic is data encryption logic, and processing is encryption processing; or the data processing logic is data decryption logic, and processing is decryption processing; or the data processing logic is data compression logic, and processing is compression processing; or the data processing logic is data decompression logic, and processing is decompression processing; or the data processing logic is data format conversion logic, and processing is format conversion processing; or the data processing logic is data content transformation logic, and processing is content transformation processing; or the data processing logic is data filtering logic, and processing is filtering processing.

In a possible implementation, that a cloud storage service apparatus stores an object file includes: The cloud storage service apparatus receives and stores the object file uploaded by a first client or a second client.

A fifth aspect of embodiments of this disclosure provides a file upload method based on a public cloud technology, and the method includes: A cloud storage service apparatus provides a file upload interface, where the file upload interface is configured to receive an upload request and an objective function that are for an object file and that are sent by a client, and the objective function is data processing logic defined by a tenant for the object file. The cloud storage service apparatus stores the object file, and sends the objective function to a cloud function service apparatus.

In a possible implementation, that the cloud storage service apparatus stores the object file includes: The cloud storage service apparatus receives and stores the object file uploaded by a first client or a second client.

A sixth aspect of embodiments of this disclosure provides a cloud storage service apparatus, and the apparatus includes: a storage module, configured to store an object file, and provide a file download interface, where the file download interface is configured to receive a download request and an objective function that are for the object file and that are sent by a client, and the objective function is data processing logic defined by a tenant for the object file; a first sending module, configured to send the object file and the objective function to a cloud function service apparatus; a receiving module, configured to receive the cloud function service apparatus sent by the cloud function service apparatus, and run the objective function, to process, based on the data processing logic, a processed file generated by the object file; and a second sending module, configured to send the processed file to the client.

In a possible implementation, the storage module is configured to receive and store the object file uploaded by a first client or a second client.

A seventh aspect of embodiments of this disclosure provides a cloud storage service apparatus, and the apparatus includes: a storage module, configured to store an object file, and provide a file update interface, where the file download interface is configured to receive a write request and an objective function that are for the object file and that are sent by a client, and the objective function is data processing logic defined by a tenant for the object file; a sending module, configured to send to-be-written data carried in the write request and the objective function to a cloud function service apparatus; a receiving module, configured to receive the cloud function service apparatus sent by the cloud function service apparatus, and run the objective function, to process, based on the data processing logic, processed data generated by the to-be-written data; and a write module, configured to write the processed data into the object file.

In a possible implementation, the storage module is configured to receive and store the object file uploaded by a first client or a second client.

An eighth aspect of embodiments of this disclosure provides a cloud storage service apparatus, and the apparatus includes: a provision module, configured to provide a file upload interface, where the file upload interface is configured to receive an upload request and an objective function that are for an object file and that are sent by a client, and the objective function is data processing logic defined by a tenant for the object file; and a storage module, configured to store the object file, and send the objective function to a cloud function service apparatus.

In a possible implementation, the storage module is configured to receive and store the object file uploaded by a first client or a second client.

A ninth aspect of embodiments of this disclosure provides a cloud storage service apparatus, and the system includes a memory and a processor. The memory stores code. The processor is configured to execute the code. When the code is executed, the cloud storage service apparatus performs the method according to any one of the third aspect or the possible implementations of the third aspect, the method according to any one of the fourth aspect or the possible implementations of the fourth aspect, or the method according to any one of the fifth aspect or the possible implementations of the fifth aspect.

A tenth aspect of embodiments of this disclosure provides a computer storage medium. The computer storage medium stores one or more instructions. When the instruction is executed by one or more computers, the one or more computers are enabled to implement the method according to any one of the third aspect or the possible implementations of the third aspect, the method according to any one of the fourth aspect or the possible implementations of the fourth aspect, or the method according to any one of the fifth aspect or the possible implementations of the fifth aspect.

An eleventh aspect of embodiments of this disclosure provides a computer program product. The computer program product stores instructions. When the instructions are executed by a computer, the computer is enabled to implement the method according to any one of the third aspect or the possible implementations of the third aspect, the method according to any one of the fourth aspect or the possible implementations of the fourth aspect, or the method according to any one of the fifth aspect or the possible implementations of the fifth aspect.

In embodiments of this disclosure, the object file may be directly transmitted between the cloud function service apparatus and the cloud storage service apparatus, that is, the cloud storage service apparatus may directly send the object file to the cloud function service apparatus, and the cloud function service apparatus may directly send the processed object file to the cloud storage service apparatus. The I/O path for object file transmission does not pass through the gateway. In comparison with another technology, the I/O path for object file transmission can be effectively shortened, and the data transmission latency can be reduced. Therefore, in the service scenario that is sensitive to the data transmission latency, the requirement of the tenant can be met.

DESCRIPTION OF EMBODIMENTS

Embodiments of this disclosure provide a public cloud system and a related method thereof, so that an I/O path for file transmission can be shortened, and a data transmission latency can be reduced. Therefore, in a service scenario that is sensitive to the data transmission latency, a requirement of a user can be met.

In the specification, claims, and accompanying drawings of this disclosure, the terms such as "first" and "second" are intended to distinguish between similar objects but do not necessarily indicate an order or sequence. It should be understood that the terms used in this way may be interchanged in appropriate cases, and this is merely a manner of distinguishing between objects with a same attribute for description in embodiments of this disclosure. Moreover, the terms "including" and "with" and any variations thereof are intended to cover non-excluding inclusions, so that a process, method, system, product, or device including a series of units is not necessarily limited to those units, but may include other units not clearly listed or inherent to such a process, method, product or device.

Cloud storage is a new network storage technology extended and developed based on a concept of cloud computing. This technology allows a large number of virtualized storage resources to be deployed on a plurality of servers, to store data of a large number of users. Data obtained by the user from these servers is usually data obtained through processing. Therefore, enabling the server to have a data processing capability becomes a new requirement.

Figure 1:
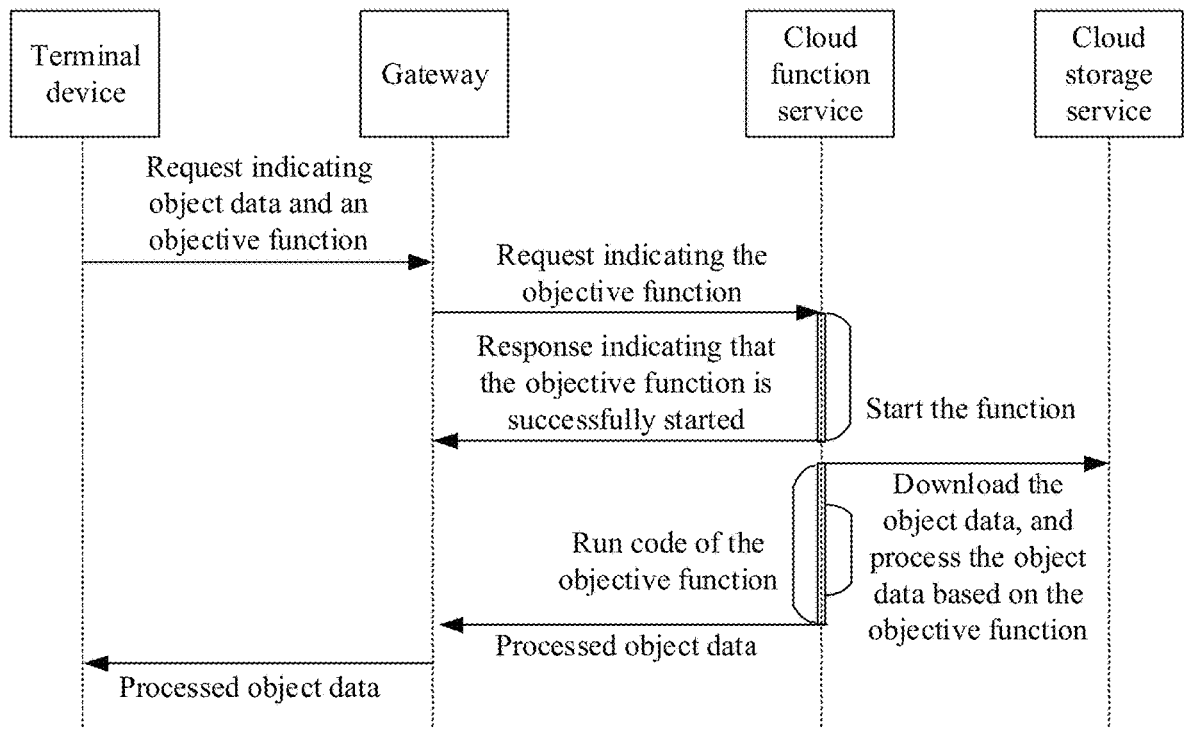
FIG. 1 is a schematic diagram of a data transmission process.

Currently, a public cloud system may include a cloud storage service apparatus, a cloud function service apparatus, a gateway, and the like. Usually, the user may access the public cloud system via a client, to obtain the data. To facilitate understanding of a data obtaining process, the following further describes the process with reference to FIG. 1. As shown in FIG. 1 (FIG. 1 is a schematic diagram of a data transmission process), the user may send, to the gateway via the client, a request indicating an object file (for example, image data) and an objective function (for example, a function corresponding to an image compression function), so that the gateway sends, to the cloud function service apparatus, a request indicating the objective function. Then, after starting the objective function based on the request, the cloud function service apparatus may send, to the gateway, a response indicating that the objective function is successfully started. Then, the cloud function service apparatus may download the object file from the cloud storage service apparatus, and call the objective function to process the object file (for example, to perform compression processing on the image data). Finally, the cloud function service apparatus sends a processed object file (for example, compressed image data) to the gateway, so that the gateway returns the processed object file to the client for use by the user.

In the foregoing process, an I/O path for end-to-end transmission of the object file is excessively long, which results in a high data transmission latency. In a service scenario that is sensitive to the data transmission latency, a requirement of the user usually cannot be met.

Figure 2:
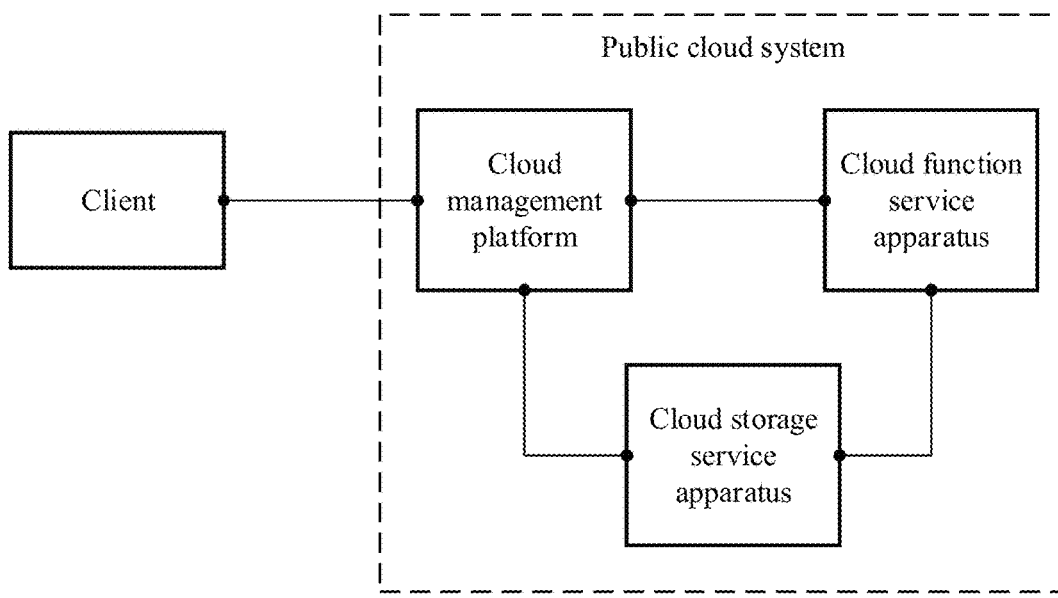
FIG. 2 is a schematic diagram of a structure of a public cloud system according to an embodiment of this disclosure.

To resolve this problem, an embodiment of this disclosure provides a data processing method. The method may be applied to a public cloud system shown in FIG. 2 (FIG. 2 is a schematic diagram of a structure of the public cloud system according to an embodiment of this disclosure). The system includes a cloud management platform, a cloud storage service apparatus, and a cloud function service apparatus. The cloud management platform may be oriented to a plurality of tenants, and manage communication between the tenant and the cloud storage service apparatus and the cloud function service apparatus. From a perspective of hardware, the cloud management platform, the cloud storage service apparatus, and the cloud function service apparatus may all be implemented based on one or more servers. A server configured to implement cloud management may be referred to as the cloud management platform (a quantity of this part of servers may be set according to an actual requirement, and is not limited herein). A server configured to implement a cloud function service may be referred to as the cloud function service apparatus (a quantity of this part of servers may be set according to an actual requirement, and is not limited herein). A server configured to implement a cloud storage service is referred to as a cloud storage service apparatus (this part of servers may be set according to an actual requirement, and is not limited herein). The three parts of servers are in a communication connection, and may interact with each other, to implement data transmission. The following respectively describes the cloud management platform, the cloud function service apparatus, and the cloud function service apparatus.

The cloud management platform may be oriented to the tenant and provide a registration interface. The registration interface may obtain an account and a password that are entered by the tenant, so that the cloud management platform registers the tenant based on the account of the tenant and the password of the tenant. After registration is completed, the tenant may log in to, via a client used by the tenant, the cloud management platform by using the account and the password of the tenant, to access the cloud storage service apparatus and the cloud function service apparatus via the cloud management platform, and implement communication with the cloud storage service apparatus and the cloud function service apparatus (for example, after the tenant logs in to the cloud management platform by using a mobile phone, the cloud management platform may be presented as a user interface on the mobile phone of the tenant, and display a trigger area of the cloud function service and a trigger area of the cloud storage service on the user interface; and therefore, the mobile phone of the tenant may jump to the cloud function service apparatus and the cloud storage service apparatus in the corresponding trigger areas, to implement communication with the two modules).

Figure 3:
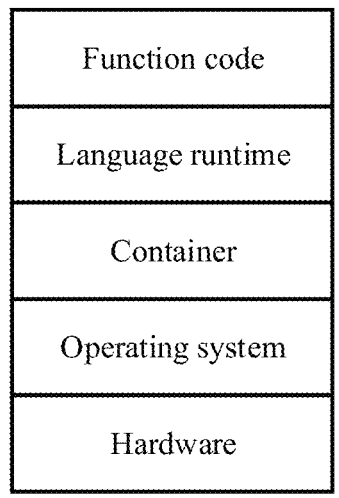
FIG. 3 is a schematic diagram of a structure of a cloud function service apparatus according to an embodiment of this disclosure.

The cloud function service apparatus may also be referred to as a function-as-a-service module. As shown in FIG. 3 (FIG. 3 is a schematic diagram of a structure of the cloud function service apparatus according to an embodiment of this disclosure), the cloud function service apparatus may be logically divided into a hardware layer (hardware), an operating system layer (operating system), a sandbox layer (container), a language runtime layer (language runtime), and a function layer (function code). The hardware layer usually means various hardware resources in the cloud function service apparatus (for example, an x86 or ARM server), a computing resource (for example, a central processing unit (CPU), a storage resource (for example, various types of memories), a communication resource (for example, a wired or wireless communication interface), and the like. The operating system layer means an operating system installed on the cloud function service apparatus. The sandbox layer usually means a sandbox (for example, a container) that is created based on a lightweight sandbox technology and that has a secure running environment. An application run in the sandbox cannot access data in the operating system, and therefore may securely execute some untrusted function code in the application. The language runtime layer means development language runtime (which may also be referred to as a running environment of a development language) used by an application. After the application is started, function code is executed by the development language runtime. The function layer usually means functions in an application (code of these functions is usually written by the tenant according to a requirement of the tenant, and may be understood as data processing logic defined by the tenant for a file, where processing may be performed on the file based on the data processing logic, and details are not described herein), that is, function code obtained through programming based on the development language.

The cloud storage service apparatus usually means a server in a server cluster configured to implement the cloud storage service apparatus. The cloud storage service apparatus may be deployed with a plurality of virtual instances (for example, a virtual machine (VM) or a container) based on a virtualization technology. These virtual instances may run applications used to implement a storage function. The tenant may access the cloud storage service apparatus via the client, and implement file transmission with these applications, to implement file upload (it can be learned that the cloud storage service apparatus stores a file and the like uploaded by the tenant) or download. It can be learned that these virtual instances may alternatively be understood as virtualized storage resources deployed at a backend, and are provided to the tenant in a manner of a storage resource pool, so that the tenant independently uses the storage resource pool to store or extract a file. It should be noted that the cloud storage service apparatus may further provide an interface for the tenant. The interface may receive a function written by the tenant, and set the function in the cloud function service apparatus.

It should be understood that, interaction between the client and the cloud management platform may be considered as interaction between the client and the server configured to implement cloud management, interaction between the client and the cloud storage service apparatus may be considered as interaction between the client and the server configured to implement the cloud storage service, and interaction between the cloud storage service apparatus and the cloud function service apparatus may be considered as interaction between the server configured to implement the cloud storage service and the server configured to implement the cloud function service, which are not described in the following again.

It should be noted that the foregoing public cloud system may implement a plurality of service scenarios. A first service scenario is a scenario in which the tenant downloads a file, and a second service scenario is a scenario in which the tenant writes data. The following first describes the first service scenario. In this scenario, when the tenant needs to obtain a processed object file, the tenant may log in to, via the client, the cloud management platform in the foregoing public cloud system by using the account and the password of the tenant, and the cloud management platform may jump to the cloud function service apparatus or the cloud storage service apparatus. In this way, the tenant may implement information interaction with the cloud storage service apparatus via the client, to obtain, in cooperation with the cloud storage service apparatus and the cloud function service apparatus, the processed object file required by the tenant. The tenant may first send a download request for an object file to the cloud storage service apparatus via the client used by the tenant. After receiving the download request, the cloud storage service apparatus may determine, based on the download request, that the client needs the object file. Therefore, the cloud storage service apparatus may send the stored object file to the cloud function service apparatus. Then, the cloud function service apparatus may run an objective function (the objective function is data processing logic defined by the tenant for the object file), to process the object file based on the data processing logic, and then return the processed object file to the cloud storage service apparatus. Finally, the cloud storage service apparatus sends, to the client for use by the tenant, the processed object file as a download response.

Further, the object file may be transmitted between the cloud function service apparatus and the cloud storage service apparatus in the following manner: A target channel used to transmit the object file may be established between the cloud function service apparatus and the cloud storage service apparatus. The target channel may be an HTTP-based communication channel, or a TCP-based communication channel, or a WebSocket protocol-based communication channel, or a remote procedure call RPC protocol-based communication channel, or the like. Certainly, the target channel may alternatively be a communication channel based on some customized transmission protocols. This is not limited herein. Therefore, based on the target channel, the cloud function service apparatus may obtain the object file from the cloud storage service apparatus, process the object file based on the objective function, and then directly send the processed object file to the cloud storage service apparatus, so that the cloud storage service apparatus feeds back processed data to the client for use by the user. It can be learned that an I/O path for data transmission can be shortened based on the target channel.

To establish the target channel, the code of the language runtime layer in the cloud function service apparatus may be modified, to embed a functional module into the language runtime layer. The functional module may be presented in two manners. The following respectively describes the two manners.

Figure 4:
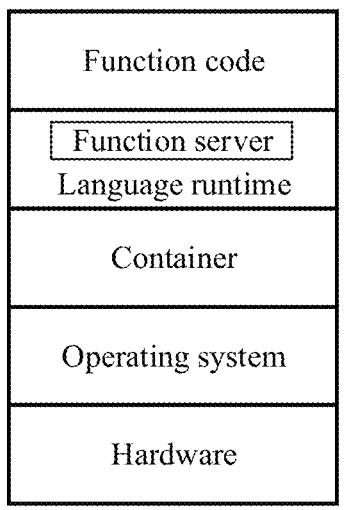
FIG. 4 is another schematic diagram of a structure of a cloud function service apparatus according to an embodiment of this disclosure.
Figure 5:
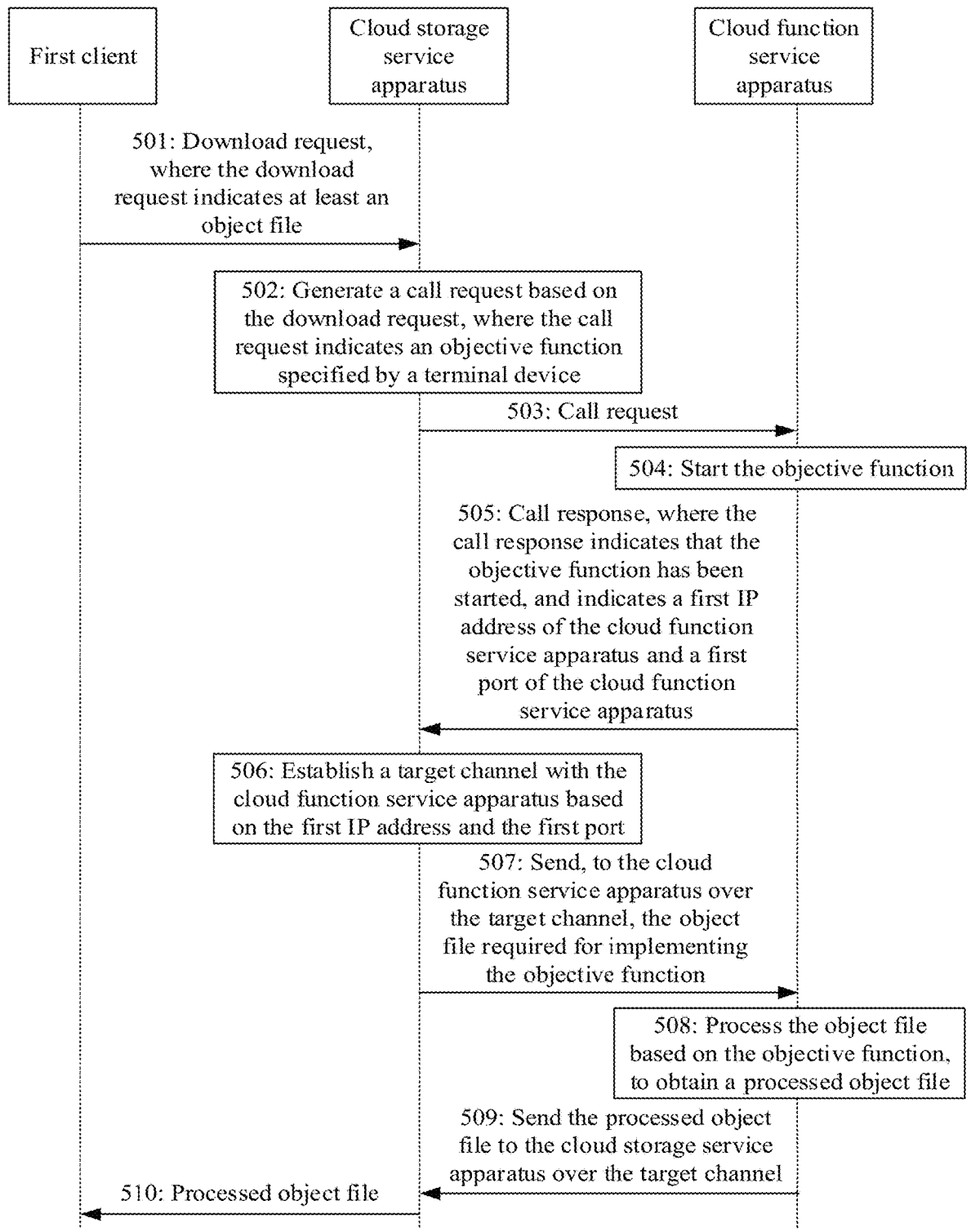
FIG. 5 is a schematic flowchart of a data processing method according to an embodiment of this disclosure.

As shown in FIG. 4 (FIG. 4 is another schematic diagram of a structure of a cloud function service apparatus according to an embodiment of this disclosure), for a first manner, a functional module in the cloud function service apparatus may serve as a service side (function server), and an application that is in a cloud storage service apparatus and that is used to implement a storage function serves as a client side (client). In this case, the function server may have a port listening function, to establish a target channel with the application that is in the cloud storage service apparatus and that is used to implement the storage function. Further, the function server may further trigger an objective function via a preset interface, and execute the objective function, to implement data processing. To further understand a working process of the function server, the following further describes the process with reference to FIG. 5 (FIG. 5 is a schematic flowchart of a data processing method according to an embodiment of this disclosure). As shown in FIG. 5, the process includes the following steps.

501: A cloud storage service apparatus receives a download request from a first client, where the download request indicates at least an object file.

In this embodiment, when a first tenant needs to obtain a processed object file, the first tenant may send, via the first client used by the first tenant, the download request to the cloud storage service apparatus provided by a cloud management platform, and the download request indicates at least the object file. The download request may be presented in a plurality of forms, which are respectively described in the following.

In a possible implementation, the download request may include an identifier of the object file and an identifier of an objective function. Therefore, the download request may indicate the object file and the objective function. It may be understood that the object file is data specified by the first client (data required by the first tenant), and the objective function is a function specified by the first client (after the function is executed, processing that the first tenant wants to perform on the object file may be completed). For example, when the first tenant needs to obtain compressed image data, the first tenant may send, by using a mobile phone, a request to a server that provides the cloud storage service apparatus, and the request indicates original image data and a function corresponding to compression processing.

In another possible implementation, the download request may include only an identifier of the object file. Therefore, the download request may indicate the object file. For example, when the first tenant needs to obtain compressed image data, the first tenant may send, by using a mobile phone, a request to a server that provides the cloud storage service apparatus, and the request indicates original image data.

It should be understood that, in step 501, that the first client sends the download request to the cloud storage service apparatus may alternatively be understood as that the first client sends the download request to an application that is in the cloud storage service apparatus and that is used to implement a storage function.

502: The cloud storage service apparatus generates a call request based on the download request, where the call request indicates the objective function specified by the first client.

After obtaining the download request, the cloud storage service apparatus may generate the call request based on the download request. The call request indicates the objective function. The cloud storage service apparatus may generate the call request in a plurality of manners, which are respectively described in the following.

In a possible implementation, it is assumed that the download request includes both the identifier of the object file and the identifier of the objective function. After obtaining the download request, the cloud storage service apparatus may first parse the download request to obtain the identifier of the object file and the identifier of the objective function. Therefore, based on the two identifiers, the cloud storage service apparatus may determine that the first tenant needs to process the object file based on the objective function. Therefore, the cloud storage service apparatus may generate the call request including the identifier of the objective function. It can be learned that the call request may indicate the objective function.

In another possible implementation, it is assumed that the download request includes only the identifier of the object file. After obtaining the download request, the cloud storage service apparatus may first parse the download request to obtain the identifier of the object file. Then, based on the identifier, the cloud storage service apparatus may determine that the first tenant needs to process the object file. As for a function that the first tenant wants to use to process the object file, the cloud storage service apparatus may determine, in a preset rule (the rule may be made by the first tenant in advance, and the rule includes correspondences between a plurality of types of data and a plurality of types of functions), the objective function corresponding to the object file. Finally, the cloud storage service apparatus may generate the call request including the identifier of the objective function. It can be learned that the call request may indicate the objective function.

It should be understood that, in step 502, that the cloud storage service apparatus generates a call request based on the download request may alternatively be understood as that the application that is in the cloud storage service apparatus and that is used to implement the storage function generates the call request based on the download request.

503: A cloud function service apparatus receives the call request from the cloud storage service apparatus.

504: The cloud function service apparatus starts the objective function.

505: The cloud function service apparatus sends a call response to the cloud storage service apparatus, where the call response indicates that the objective function has been started, and indicates a first IP address of the cloud function service apparatus and a first port of the cloud function service apparatus.

After obtaining the call request, the cloud storage service apparatus may send the call request to the cloud function service apparatus, and the cloud function service apparatus may parse the call request to obtain the identifier of the objective function. Based on the identifier, the cloud function service apparatus may determine that some data needs to be processed based on the objective function. Therefore, the cloud function service apparatus may start the objective function. After the objective function is started, the cloud function service apparatus may return the call response to the cloud storage service apparatus. The call response may include an identifier of successfully starting the objective function, an identifier of the first IP address of the cloud function service apparatus, and an identifier of the first port of the cloud function service apparatus. Therefore, the call response may indicate that the objective function has been started, and may also indicate the first IP address of the cloud function service apparatus and the first port of the cloud function service apparatus.

After an operating system of the cloud function service apparatus receives the call request from the application that is in the cloud storage service apparatus and that is used to implement the storage function, the operating system of the cloud function service apparatus may start a sandbox, and run development language runtime, so that a development language runs to create a function server. After the function server is created, the objective function may be started via a preset interface, and information such as an IP address and a port is listened to in real time.

It should be noted that, after the function server is created, a port and an IP address may be configured for the function server. The port is the first port, and the IP address is the first IP address. In this case, after the function server starts the objective function, the operating system of the cloud function service apparatus may send the call response to the application that is in the cloud storage service apparatus and that is used to implement the storage function. The call response indicates that the function server has started the objective function, and indicates the IP address of the function server, and the port of the function server.

It should be understood that the objective function may be data processing logic defined by the first tenant for the object file (that is, the objective function is written by the first tenant), or may be data processing logic defined by a second tenant (that is, a tenant other than the first tenant) for the object file (that is, the objective function is written by the second tenant). This is not limited herein.

506: The cloud storage service apparatus establishes a target channel with the cloud function service apparatus based on the first IP address and the first port.

After receiving the call response from the cloud function service apparatus, the cloud storage service apparatus may parse the call response to obtain the identifier of successfully starting the objective function, the identifier of the first IP address of the cloud function service apparatus, and the identifier of the first port of the cloud function service apparatus. Based on the information, the cloud storage service apparatus may determine that the objective function has been successfully started, and determine the first IP address and the first port of the cloud function service apparatus. In this case, the cloud storage service apparatus may establish the target channel with the cloud function service apparatus based on the first IP address and the first port. The target channel is a communication channel used to transmit the object file.

After determining, based on the call response, that the function server has started the objective function, the application that is in the cloud storage service apparatus and that is used to implement the storage function considers that a connection may be established to the function server. Then, the application may determine the IP address of the function server and the port of the function server based on the call response, and initiate a socket connection to the function server based on the IP address of the function server and the port of the function server, to establish a communication channel between the function server and the application that is in the cloud storage service apparatus and that is used to implement the storage function. The communication channel is the target channel, and is used to transmit data between the function server and the application that is in the cloud storage service apparatus and that is used to implement the storage function.

It should be noted that, the communication channel between the function server of the cloud function service apparatus and the application that is in the cloud storage service apparatus and that is used to implement the storage function and a communication channel between the operating system of the cloud function service apparatus and the application that is in the cloud storage service apparatus and that is used to implement the storage function are different communication channels. The former is established based on the port of the function server and the IP address of the function server, and the latter is connected based on a port of the operating system of the cloud function service apparatus and an IP address of the operating system of the cloud function service apparatus. It may be understood that the port of the function server and the port of the operating system of the cloud function service apparatus are different ports, and the IP address of the function server and the IP address of the operating system of the cloud function service apparatus are usually the same IP address (that is, an IP address of the cloud function service apparatus).

507: The cloud storage service apparatus sends, to the cloud function service apparatus over the target channel, the object file required for implementing the objective function.

After the target channel is established between the cloud storage service apparatus and the cloud function service apparatus, because the cloud storage service apparatus has determined, based on the download request, that the object file needs to be sent to the cloud function service apparatus, the cloud storage service apparatus may send, to the cloud function service apparatus over the target channel, the object file required for implementing the objective function.

After the communication channel is established between the application that is in the cloud storage service apparatus and that is used to implement the storage function and the function server of the cloud function service apparatus, the application that is in the cloud storage service apparatus and that is used to implement the storage function may send the object file to the function server over the communication channel.

508: The cloud function service apparatus processes the object file based on the objective function, to obtain the processed object file.

After obtaining the object file, the cloud function service apparatus may process the object file based on the objective function, to obtain the processed object file. It should be noted that, because the objective function is the data processing logic defined by the tenant for the object file, when the cloud function service apparatus processes the object file based on the objective function, it is equivalent to that the cloud function service apparatus processes the object file based on the data processing logic, to obtain the processed object file. Still as in the foregoing example, after the cloud storage service apparatus sends the original image data to the cloud function service apparatus, the cloud function service apparatus may process the original image data based on the function corresponding to compression processing, to obtain processed image data.

After obtaining the object file, the function server may continue to execute code of the objective function, to process the object file and obtain the processed object file.

Further, because the data processing logic is defined by the tenant according to a requirement of the tenant, the data processing logic may be presented in a plurality of manners, which are respectively described in the following.

(1) If the data processing logic is data encryption logic, the cloud function service apparatus may perform encryption processing on the object file based on the data encryption logic, and the processed object file may be considered as an encrypted object file (in this case, the object file is usually an unencrypted file, for example, a compressed package that may be directly opened). (2) If the data processing logic is data decryption logic, the cloud function service apparatus may perform decryption processing on the object file based on the data encryption logic, and the processed object file may be considered as a decrypted object file (in this case, the object file is usually an encrypted file, for example, an encrypted compressed package). (3) If the data processing logic is data compression logic, the cloud function service apparatus may perform compression processing on the object file based on the data compression logic, and the processed object file may be considered as a compressed object file (in this case, the object file is usually an uncompressed file, for example, an original image). (4) If the data processing logic is data decompression logic, the cloud function service apparatus may perform decompression processing on the object file based on the data decompression logic, and the processed object file may be considered as a decompressed object file (in this case, the object file is usually a compressed file, for example, an image obtained through compression processing). (5) If the data processing logic is data format conversion logic, the cloud function service apparatus may perform format conversion processing on the object file based on the data format conversion logic, and the processed object file may be considered as an object file obtained through format conversion (for example, a file in a pdf format is converted into a file in a doc format). (6) If the data processing logic is data content transformation logic, the cloud function service apparatus may perform content transformation processing on the object file based on the data format conversion logic, and the processed object file may be considered as an object file obtained through content transformation (for example, a text in a file is transformed into a voice). (7) If the data processing logic is data filtering logic, the cloud function service apparatus may perform content transformation processing on the object file based on data format filtering, and the processed object file may be considered as a filtered object file (in this case, the object file is usually an unfiltered file, and includes various symbols with unknown meanings, garbled characters, and the like).

509: The cloud function service apparatus sends the processed object file to the cloud storage service apparatus over the target channel.

After obtaining the processed object file, the cloud function service apparatus may send the processed object file to the cloud storage service apparatus over the target channel.

After obtaining the processed object file, the function server may send, over the communication channel between the function server and the application that is in the cloud storage service apparatus and that is used to implement the storage function, the processed object file to the application that is in the cloud storage service apparatus and that is used to implement the storage function.

510: The cloud storage service apparatus sends the processed object file to the first client.

After obtaining the processed object file, the cloud storage service apparatus may generate a download response, where the download response includes the processed object file; and send the download response to the first client for use by the first tenant.

It should be understood that, in step 510, that the cloud storage service apparatus generates the download response may alternatively be understood as that the application that is in the cloud storage service apparatus and that is used to implement the storage function generates the download response.

In this embodiment of this disclosure, the object file may be directly transmitted between the cloud function service apparatus and the cloud storage service apparatus, that is, the cloud storage service apparatus may directly send the object file to the cloud function service apparatus, and the cloud function service apparatus may directly send the processed object file to the cloud storage service apparatus. An I/O path for object file transmission does not pass through a gateway. In comparison with another technology, the I/O path for object file transmission can be effectively shortened, and a data transmission latency can be reduced. Therefore, in a service scenario that is sensitive to the data transmission latency, the requirement of the tenant can be met.

Further, in this embodiment of this disclosure, the application that is in the cloud storage service apparatus and that is used to implement the storage function may be directly oriented to the tenant, and provide interfaces for the tenant, so that the tenant customizes programming of the objective function on the cloud function service apparatus via these interfaces.

Figure 6:
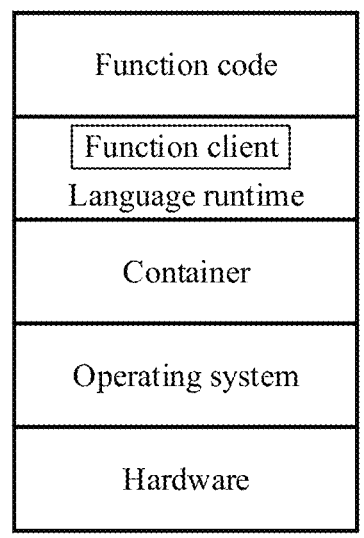
FIG. 6 is another schematic diagram of a structure of a cloud function service apparatus according to an embodiment of this disclosure.
Figure 7:
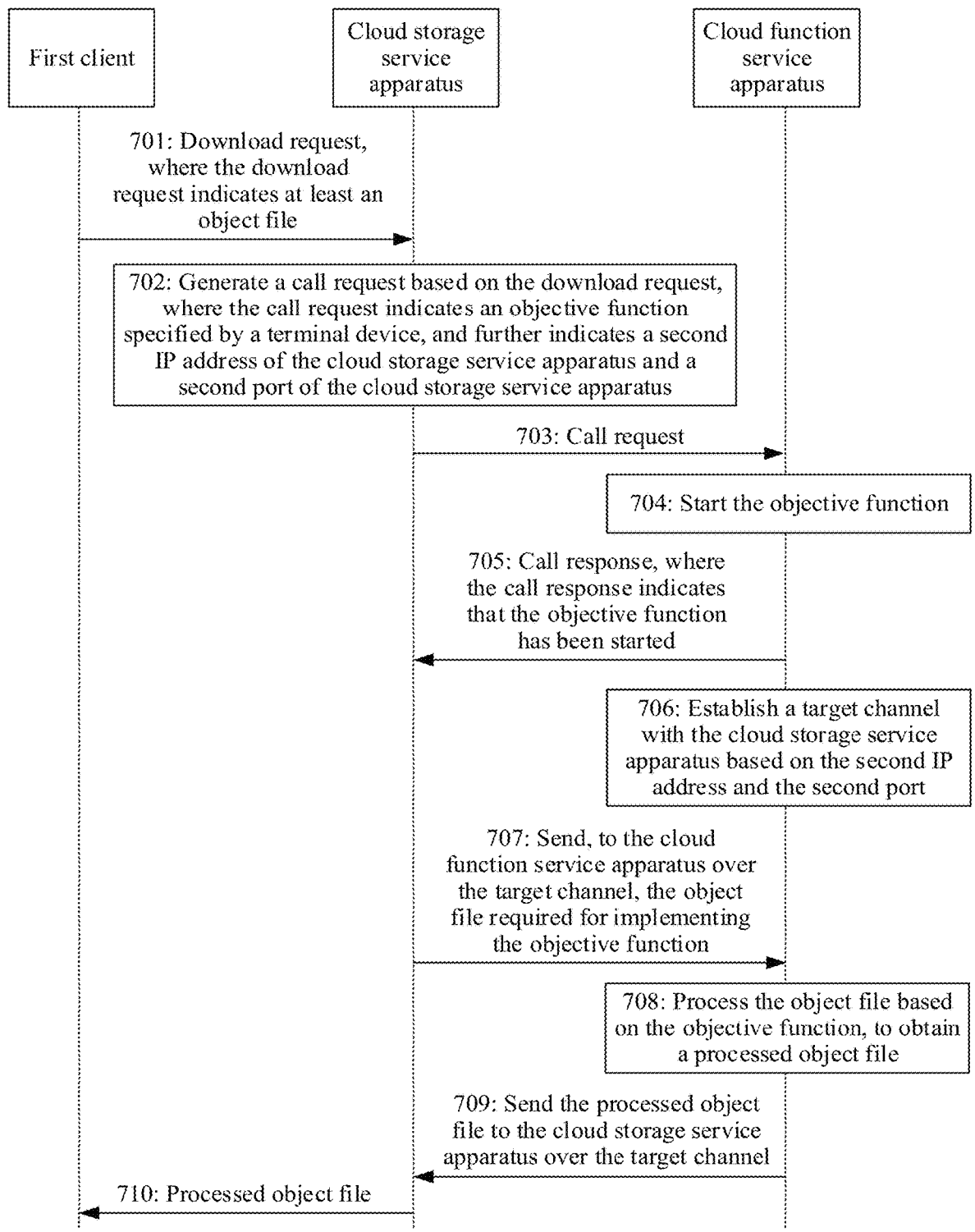
FIG. 7 is another schematic flowchart of a data processing method according to an embodiment of this disclosure.

The foregoing describes in detail the first manner of the functional module, and the following describes a second manner of the functional module. As shown in FIG. 6 (FIG. 6 is another schematic diagram of a structure of a cloud function service apparatus according to an embodiment of this disclosure), for a second manner, a functional module in the cloud function service apparatus may serve as a client side (function client), and an application that is in a cloud storage service apparatus and that is used to implement a storage function serves as a server side (server). In this case, the application that is in the cloud storage service apparatus and that is used to implement the storage function may have a port listening function, to establish a target channel with the function client. Further, the function client may further trigger an objective function via a preset interface, and execute the objective function, to implement data processing. To further understand a working process of the function client, the following further describes the process with reference to FIG. 7 (FIG. 7 is another schematic flowchart of a data processing method according to an embodiment of this disclosure). As shown in FIG. 7, the process includes the following steps.

701: A cloud storage service apparatus receives a download request from a first client, where the download request indicates at least an object file.

702: The cloud storage service apparatus generates a call request based on the download request, where the call request indicates an objective function specified by the first client, and further indicates a second IP address of the cloud storage service apparatus and a second port of the cloud storage service apparatus.

For descriptions of step 701 and step 702, refer to related descriptions of step 501 and step 502 in the embodiment shown in FIG. 5. Details are not described herein again.

It should be noted that, a difference between step 702 and step 502 lies in that the call request includes an identifier of the objective function, and also includes an identifier of the second IP address of the cloud storage service apparatus and an identifier of the second port of the cloud storage service apparatus. Therefore, the call request indicates the objective function specified by the first client, and also indicates the second IP address of the cloud storage service apparatus and the second port of the cloud storage service apparatus.

An application that is in the cloud storage service apparatus and that is used to implement a storage function serves as a server side, and may listen to information such as an IP address and a port in real time. The application that is in the cloud storage service apparatus and that is used to implement the storage function is configured with an additional port and IP address, where the port is the second port, and the IP address is the second IP address. In this case, the call request generated by the application that is in the cloud storage service apparatus and that is used to implement the storage function further includes the identifier of the port and the identifier of the IP address. Therefore, the call request indicates the objective function, and also indicates the port and the IP address of the application that is in the cloud storage service apparatus and that is used to implement the storage function.

703: A cloud function service apparatus receives the call request from the cloud storage service apparatus.
 704: The cloud function service apparatus starts the objective function.
 705: The cloud function service apparatus sends a call response to the cloud storage service apparatus, where the call response indicates that the objective function has been started.

After obtaining the call request, the cloud storage service apparatus may send the call request to the cloud function service apparatus, and the cloud function service apparatus may parse the call request to obtain the identifier of the objective function. Based on the identifier, the cloud function service apparatus may determine that some data needs to be processed based on the objective function. Therefore, the cloud function service apparatus may start the objective function. After the objective function is started, the cloud function service apparatus may return the call response to the cloud storage service apparatus. The call response usually includes only an identifier of successfully starting the objective function. Therefore, the call response may only indicate that the objective function has been started.

After an operating system of the cloud function service apparatus receives the call request from the application that is in the cloud storage service apparatus and that is used to implement the storage function, the operating system of the cloud function service apparatus may start a sandbox, and run development language runtime, so that a development language runs to create a function client. After the function client is created, the objective function may be started via a preset interface.

It should be noted that, after the function client starts the objective function, the operating system of the cloud function service apparatus may send the call response to the application that is in the cloud storage service apparatus and that is used to implement the storage function. The call response indicates that the function client has started the objective function.

It should be understood that the objective function may be data processing logic defined by a first tenant for the object file (that is, the objective function is written by the first tenant), or may be data processing logic defined by a second tenant (that is, a tenant other than the first tenant) for the object file (that is, the objective function is written by the second tenant). This is not limited herein.

706: The cloud function service apparatus establishes a target channel with the cloud storage service apparatus based on the second IP address and the second port.

After receiving the call response from the cloud function service apparatus, the cloud storage service apparatus may parse the call response to obtain the identifier of successfully starting the objective function. Based on the identifier, the cloud storage service apparatus may determine that the objective function has been successfully started. In this case, the cloud storage service apparatus allows the cloud function service apparatus to establish the target channel with the cloud storage service apparatus. The target channel is a communication channel used to transmit the object file.

After determining, based on the call response, that a function server has started the objective function, the application that is in the cloud storage service apparatus and that is used to implement the storage function allows the function client to establish a connection to the application. The function client has determined, based on the call request, a port and an IP address of the application that is in the cloud storage service apparatus and that is used to implement the storage function. In this case, the function client may initiate, based on the port and the IP address of the application, a socket connection to the application, to establish a communication channel between the function client and the application that is in the cloud storage service apparatus and that is used to implement the storage function. The communication channel is the target channel, and is used to transmit data between the function client and the application that is in the cloud storage service apparatus and that is used to implement the storage function.

It should be noted that, the communication channel between the function client of the cloud function service apparatus and the application that is in the cloud storage service apparatus and that is used to implement the storage function and a communication channel between the operating system of the cloud function service apparatus and the application that is in the cloud storage service apparatus and that is used to implement the storage function are different communication channels. Both the former and the latter are established based on the port and the IP address of the application that is in the cloud storage service apparatus and that is used to implement the storage function. However, a port that is of the application and that the former is based on and a port that is of the application and that the latter is based on are usually different ports. An IP address that is of the application and that the former is based on and an IP address that is of the application and that the latter is based on are usually the same IP address (that is, an IP address of the cloud storage service apparatus).

707: The cloud storage service apparatus sends, to the cloud function service apparatus over the target channel, the object file required for implementing the objective function.

After the target channel is established between the cloud storage service apparatus and the cloud function service apparatus, because the cloud storage service apparatus has determined, based on the download request, that the object file needs to be sent to the cloud function service apparatus, the cloud storage service apparatus may send, to the cloud function service apparatus over the target channel, the object file required for implementing the objective function.

After the communication channel is established between the application that is in the cloud storage service apparatus and that is used to implement the storage function and the function client of the cloud function service apparatus, the application that is in the cloud storage service apparatus and that is used to implement the storage function may send the object file to the function client over the communication channel.

708: The cloud function service apparatus processes the object file based on the objective function, to obtain a processed object file.

After obtaining the object file, the cloud function service apparatus may process the object file based on the objective function, to obtain the processed object file. Still as in the foregoing example, after the cloud storage service apparatus sends original image data to the cloud function service apparatus, a server of the cloud function service apparatus may process the original image data based on a function corresponding to compression processing, to obtain processed image data.

After obtaining the object file, the function client may continue to execute code of the objective function, to process the object file and obtain the processed object file.

Further, because the data processing logic is defined by the tenant according to a requirement of the tenant, the data processing logic may be presented in a plurality of manners, which are respectively described in the following.

(1) If the data processing logic is data encryption logic, the cloud function service apparatus may perform encryption processing on the object file based on the data encryption logic, and the processed object file may be considered as an encrypted object file (in this case, the object file is usually an unencrypted file, for example, a compressed package that may be directly opened). (2) If the data processing logic is data decryption logic, the cloud function service apparatus may perform decryption processing on the object file based on the data encryption logic, and the processed object file may be considered as a decrypted object file (in this case, the object file is usually an encrypted file, for example, an encrypted compressed package). (3) If the data processing logic is data compression logic, the cloud function service apparatus may perform compression processing on the object file based on the data compression logic, and the processed object file may be considered as a compressed object file (in this case, the object file is usually an uncompressed file, for example, an original image). (4) If the data processing logic is data decompression logic, the cloud function service apparatus may perform decompression processing on the object file based on the data decompression logic, and the processed object file may be considered as a decompressed object file (in this case, the object file is usually a compressed file, for example, an image obtained through compression processing). (5) If the data processing logic is data format conversion logic, the cloud function service apparatus may perform format conversion processing on the object file based on the data format conversion logic, and the processed object file may be considered as an object file obtained through format conversion (for example, a file in a pdf format is converted into a file in a doc format). (6) If the data processing logic is data content transformation logic, the cloud function service apparatus may perform content transformation processing on the object file based on the data format conversion logic, and the processed object file may be considered as an object file obtained through content transformation (for example, a text in a file is transformed into a voice). (7) If the data processing logic is data filtering logic, the cloud function service apparatus may perform content transformation processing on the object file based on data format filtering, and the processed object file may be considered as a filtered object file (in this case, the object file is usually an unfiltered file, and includes various symbols with unknown meanings, garbled characters, and the like).

709: The cloud function service apparatus sends the processed object file to the cloud storage service apparatus over the target channel.

After obtaining the processed object file, the cloud function service apparatus may send the processed object file to the cloud storage service apparatus over the target channel.

After obtaining the processed object file, the function client may send, over the communication channel between the function client and the application that is in the cloud storage service apparatus and that is used to implement the storage function, the processed object file to the application that is in the cloud storage service apparatus and that is used to implement the storage function.

710: The cloud storage service apparatus sends the processed object file to the first client.

For a description of step 710, refer to a related description of step 510 in the embodiment shown in FIG. 5. Details are not described herein again.

In this embodiment of this disclosure, after the download request from the cloud storage service apparatus is received, because the download request indicates the objective function specified by the first client, the cloud function service apparatus may obtain, from the cloud storage service apparatus, the object file required for implementing the objective function. Then, the cloud function service apparatus may process the object file based on the objective function, to obtain the processed object file. Finally, the cloud function service apparatus sends the processed object file to the cloud storage service apparatus, so that the cloud storage service apparatus sends the processed object file to the first client for use by the first tenant. In the foregoing process, the object file may be directly transmitted between the cloud function service apparatus and the cloud storage service apparatus, that is, the cloud storage service apparatus may directly send the object file to the cloud function service apparatus, and the cloud function service apparatus may directly send the processed object file to the cloud storage service apparatus. An I/O path for object file transmission does not pass through a gateway. In comparison with another technology, the I/O path for object file transmission can be effectively shortened, and a data transmission latency can be reduced. Therefore, in a service scenario that is sensitive to the data transmission latency, the requirement of the tenant can be met.

Further, in this embodiment of this disclosure, the application that is in the cloud storage service apparatus and that is used to implement the storage function may be directly oriented to the tenant, and provide interfaces for the tenant, so that the tenant customizes programming of the objective function on the cloud function service apparatus via these interfaces.

The foregoing describes the first service scenario in detail, and the following describes the second service scenario. In this scenario, when a tenant needs to obtain data written into an object file, the tenant may log in to, via a client, a cloud management platform in the foregoing public cloud system by using an account and a password of the tenant, and the cloud management platform may jump to a cloud function service apparatus or a cloud storage service apparatus. In this way, the tenant may implement information interaction with the cloud storage service apparatus via the client, to write, in cooperation with the cloud storage service apparatus and the cloud function service apparatus, the data specified by the tenant into the object file. The tenant may first send a write request for the object file to the cloud storage service apparatus via the client used by the tenant. After receiving the write request, the cloud storage service apparatus may determine, based on the write request, that the client needs to write the data into the object file. Therefore, the cloud storage service apparatus may send the carried to-be-written data (that is, the data specified by the tenant) to the cloud function service apparatus. Then, the cloud function service apparatus may run an objective function (the objective function is data processing logic defined by the tenant for the object file), to process the to-be-written data based on the data processing logic, and then return processed data to the cloud storage service apparatus. Finally, the cloud storage service apparatus writes the processed data into the object file, to update content of the object file.

Further, the to-be-written data may be transmitted between the cloud function service apparatus and the cloud storage service apparatus in the following manner: A target channel used to transmit the object file may be established between the cloud function service apparatus and the cloud storage service apparatus. The target channel may be an HTTP-based communication channel, or a TCP-based communication channel, or a WebSocket protocol-based communication channel, or a remote procedure call RPC protocol-based communication channel, or the like. Certainly, the target channel may alternatively be a communication channel based on some customized transmission protocols. This is not limited herein. Then, based on the target channel, the cloud function service apparatus may obtain the to-be-written data from the cloud storage service apparatus, process the to-be-written data based on the objective function, and then directly send the processed data to the cloud storage service apparatus, so that the cloud storage service apparatus writes the processed data into the object file. It can be learned that an I/O path for data transmission can be shortened based on the target channel.

Figure 8:
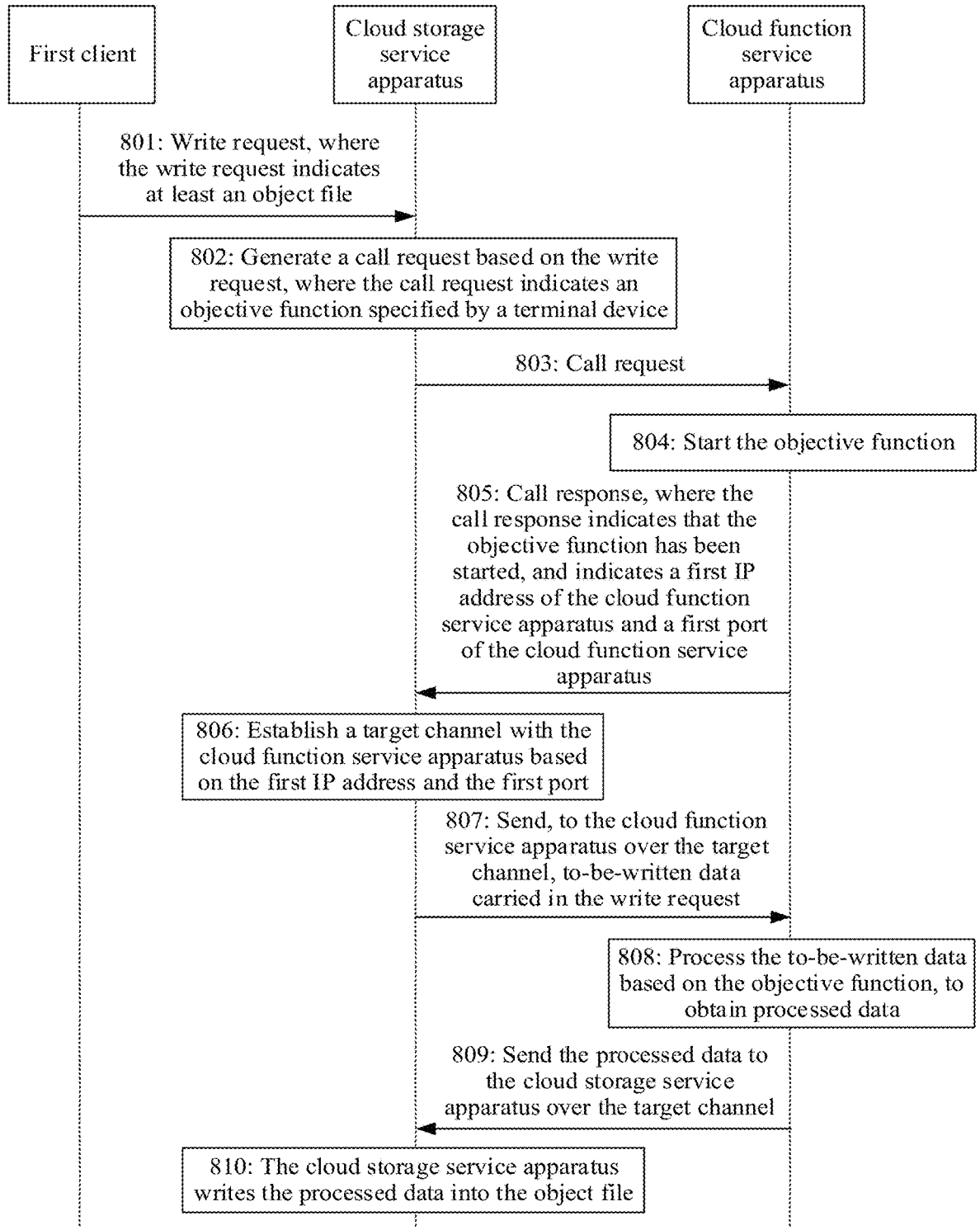
FIG. 8 is another schematic flowchart of a data processing method according to an embodiment of this disclosure.

To establish the target channel, code of a language runtime layer in the cloud function service apparatus may be modified, to embed a functional module into the language runtime layer. The functional module may be presented in two manners. In a first manner, the functional module in the cloud function service apparatus may serve as a service side (function server), and an application that is in a cloud storage service apparatus and that is used to implement a storage function serves as a client side (client). For a description of the first manner, refer to a related description part of the example shown in FIG. 4. Details are not described herein again. To further understand a working process of the function server, the following further describes the process with reference to FIG. 8 (FIG. 8 is another schematic flowchart of a data processing method according to an embodiment of this disclosure). As shown in FIG. 8, the process includes the following steps.

801: A cloud storage service apparatus receives a write request from a first client, where the write request indicates at least an object file.

802: The cloud storage service apparatus generates a call request based on the write request, where the call request indicates an objective function specified by the first client.

803: A cloud function service apparatus receives the call request from the cloud storage service apparatus.

804: The cloud function service apparatus starts the objective function.

805: The cloud function service apparatus sends a call response to the cloud storage service apparatus, where the call response indicates that the objective function has been started, and indicates a first IP address of the cloud function service apparatus, and a first port of the cloud function service apparatus.

806: The cloud storage service apparatus establishes a target channel with the cloud function service apparatus based on the first IP address and the first port.

For step 801 to step 806, refer to step 501 to step 506 in the embodiment shown in FIG. 5. Details are not described herein again. It should be noted that, although both the write request in this embodiment and the download request in the embodiment shown in FIG. 5 indicate the object file (that is, both the write request and the download request are for the object file), a difference between the write request and the download request lies in that the write request in this embodiment carries to-be-written data, and the download request in the embodiment shown in FIG. 5 does not carry data.

807: The cloud storage service apparatus sends, to the cloud function service apparatus over the target channel, the to-be-written data carried in the write request.

808: The cloud function service apparatus processes the to-be-written data based on the objective function, to obtain processed data.

809: The cloud function service apparatus sends the processed data to the cloud storage service apparatus over the target channel.

For step 807 to step 809, refer to step 507 to step 509 in the embodiment shown in FIG. 5. Details are not described herein again. It should be noted that a processing object in step 807 to step 809 is the data, and a processing object in step 507 to step 509 is the object file. In step 807 to step 809, the cloud storage service apparatus sends the to-be-written data to the cloud function service apparatus, the cloud function service apparatus processes the to-be-written data, and the cloud function service apparatus sends the processed data to the cloud storage service apparatus. In step 507 to step 509, the cloud storage service apparatus sends the object file to the cloud function service apparatus, the cloud function service apparatus processes the object file, and the cloud function service apparatus sends a processed object file to the cloud storage service apparatus.

810: The cloud storage service apparatus writes the processed data into the object file.

After obtaining the processed data, the cloud storage service apparatus may write the processed data into the object file, to update content of the object file.

It should be understood that, in step 810, that the cloud storage service apparatus performs a write operation may alternatively be understood as that the cloud storage service apparatus performs the write operation.

In this embodiment of this disclosure, the to-be-written data may be directly transmitted between the cloud function service apparatus and the cloud storage service apparatus, that is, the cloud storage service apparatus may directly send the to-be-written data to the cloud function service apparatus, and the cloud function service apparatus may directly send the processed data to the cloud storage service apparatus. An I/O path for object file transmission does not pass through a gateway. In comparison with another technology, the I/O path for object file transmission can be effectively shortened, and a data transmission latency can be reduced. Therefore, in a service scenario that is sensitive to the data transmission latency, a requirement of the tenant can be met.

Further, in this embodiment of this disclosure, an application that is in the cloud storage service apparatus and that is used to implement a storage function may be directly oriented to the tenant, and provide interfaces for the tenant, so that the tenant customizes programming of the objective function on the cloud function service apparatus via these interfaces.

Figure 9:
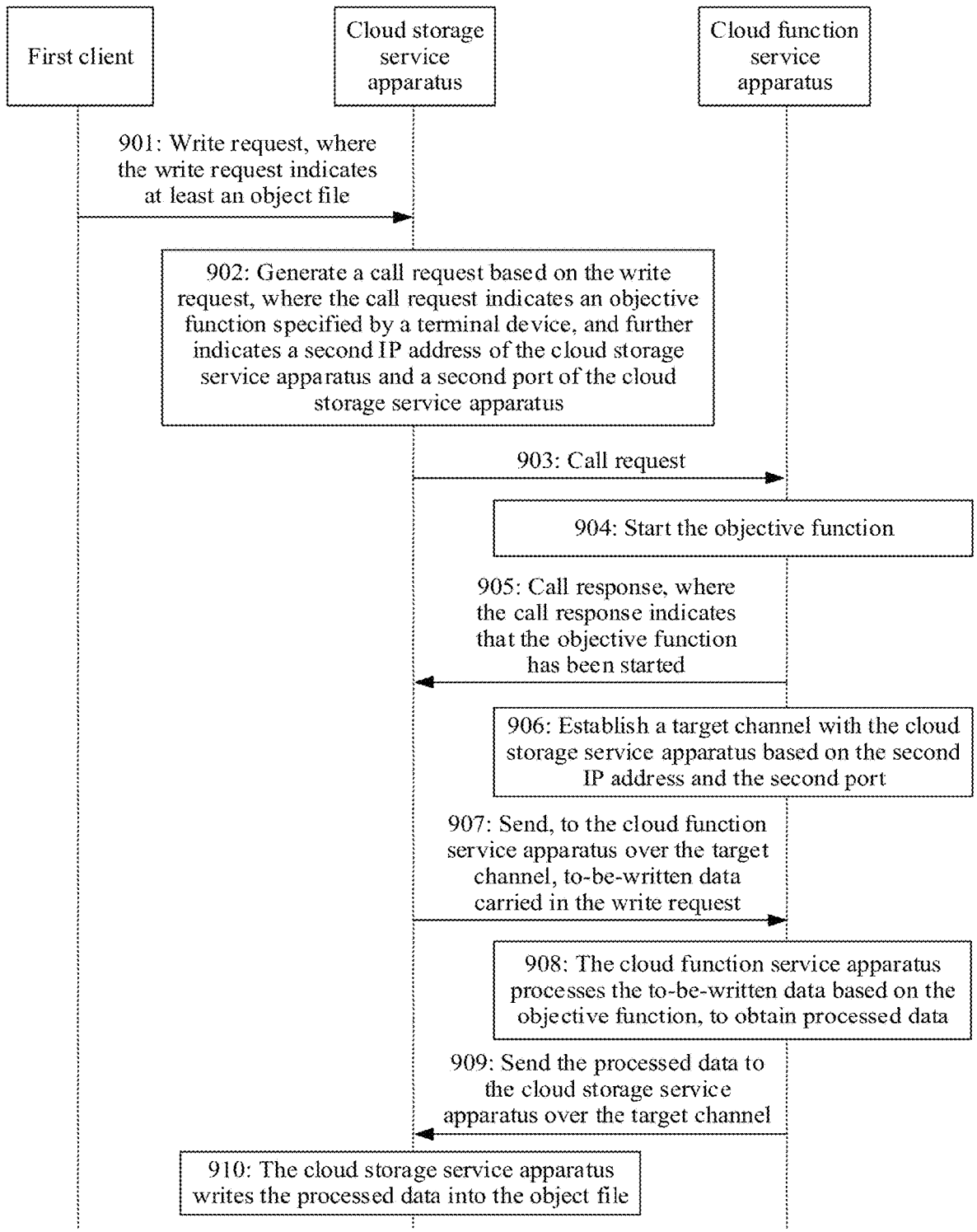
FIG. 9 is another schematic flowchart of a data processing method according to an embodiment of this disclosure.

The foregoing describes in detail the first manner of the functional module, and the following describes a second manner of the functional module. In the second manner, the functional module in the cloud function service apparatus may serve as the client side (function client), and the application that is in the cloud storage service apparatus and that is used to implement the storage function serves as the server side (server). For a description of the first manner, refer to a related description part of the example shown in FIG. 6. Details are not described herein again. To further understand a working process of the function client, the following further describes the process with reference to FIG. 9 (FIG. 9 is another schematic flowchart of a data processing method according to an embodiment of this disclosure). As shown in FIG. 9, the process includes the following steps.

901: A cloud storage service apparatus receives a write request from a first client, where the write request indicates at least an object file.

902: The cloud storage service apparatus generates a call request based on the write request, where the call request indicates an objective function specified by the first client, and further indicates a second IP address of the cloud storage service apparatus and a second port of the cloud storage service apparatus.

903: A cloud function service apparatus receives the call request from the cloud storage service apparatus.

904: The cloud function service apparatus starts the objective function.

905: The cloud function service apparatus sends a call response to the cloud storage service apparatus, where the call response indicates that the objective function has been started.

906: The cloud function service apparatus establishes a target channel with the cloud storage service apparatus based on the second IP address and the second port.

For step 901 to step 906, refer to step 701 to step 706 in the embodiment shown in FIG. 7. Details are not described herein again. It should be noted that, although both the write request in this embodiment and the download request in the embodiment shown in FIG. 7 indicate the object file (that is, both the write request and the download request are for the object file), a difference between the write request and the download request lies in that the write request in this embodiment carries to-be-written data, and the download request in the embodiment shown in FIG. 7 does not carry data.

907: The cloud storage service apparatus sends, to the cloud function service apparatus over the target channel, the to-be-written data carried in the write request.

908: The cloud function service apparatus processes the to-be-written data based on the objective function, to obtain processed data.

909: The cloud function service apparatus sends the processed data to the cloud storage service apparatus over the target channel.

For step 907 to step 909, refer to step 707 to step 709 in the embodiment shown in FIG. 7. Details are not described herein again. It should be noted that a processing object in step 907 to step 909 is the data, and a processing object in step 707 to step 709 is the object file. In step 907 to step 909, the cloud storage service apparatus sends the to-be-written data to the cloud function service apparatus, the cloud function service apparatus processes the to-be-written data, and the cloud function service apparatus sends the processed data to the cloud storage service apparatus. In step 707 to step 709, the cloud storage service apparatus sends the object file to the cloud function service apparatus, the cloud function service apparatus processes the object file, and the cloud function service apparatus sends a processed object file to the cloud storage service apparatus.

910: The cloud storage service apparatus writes the processed data into the object file.

For a description of step 910, refer to a related description of step 810 in the embodiment shown in FIG. 8. Details are not described herein again.

In this embodiment of this disclosure, the to-be-written data may be directly transmitted between the cloud function service apparatus and the cloud storage service apparatus, that is, the cloud storage service apparatus may directly send the to-be-written data to the cloud function service apparatus, and the cloud function service apparatus may directly send the processed data to the cloud storage service apparatus. An I/O path for object file transmission does not pass through a gateway. In comparison with another technology, the I/O path for object file transmission can be effectively shortened, and a data transmission latency can be reduced. Therefore, in a service scenario that is sensitive to the data transmission latency, a requirement of the tenant can be met.

Further, in this embodiment of this disclosure, an application that is in the cloud storage service apparatus and that is used to implement a storage function may be directly oriented to the tenant, and provide interfaces for the tenant, so that the tenant customizes programming of the objective function on the cloud function service apparatus via these interfaces.

It should be noted that the client in this embodiment of this disclosure may be outside a public cloud system and is, for example, a local terminal device of the tenant; or may be inside a public cloud and is, for example, a virtual machine, a container, or a bare metal server leased by the tenant in the public cloud.

Figure 10:
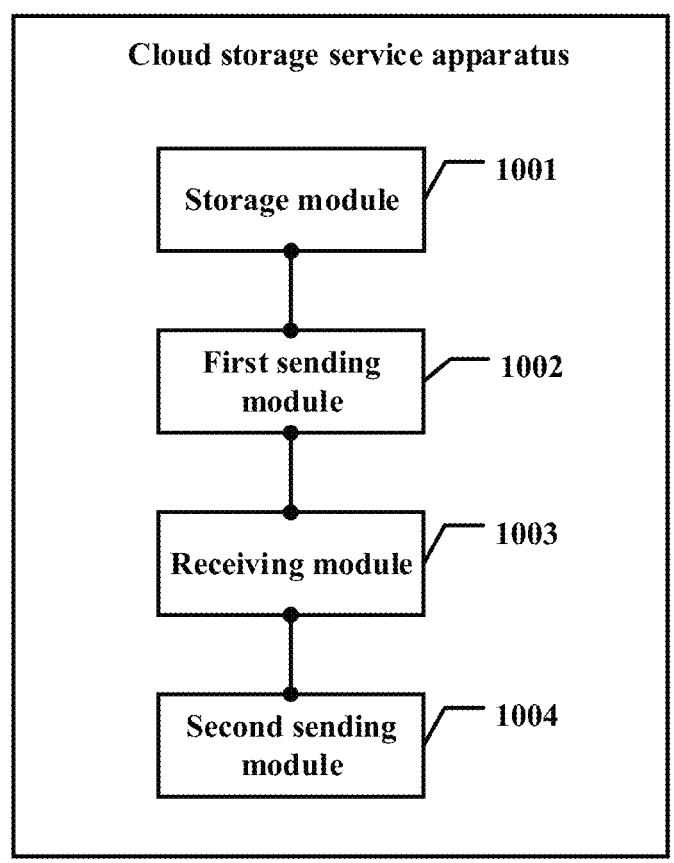
FIG. 10 is a schematic diagram of a structure of a cloud storage service apparatus according to an embodiment of this disclosure.

The foregoing describes in detail the public cloud system and the related method thereof provided in embodiments of this disclosure. The following describes a cloud storage service apparatus provided in embodiments of this disclosure. FIG. 10 is a schematic diagram of a structure of a cloud storage service apparatus according to an embodiment of this disclosure. As shown in FIG. 10, the apparatus includes a storage module 1001, configured to store an object file, and provide a file download interface, where the file download interface is configured to receive a download request and an objective function that are for the object file and that are sent by a client, and the objective function is data processing logic defined by a tenant for the object file; a first sending module 1002, configured to send the object file and the objective function to a cloud function service apparatus; a receiving module 1003, configured to receive the cloud function service apparatus sent by the cloud function service apparatus, and run the objective function, to process, based on the data processing logic, a processed file generated by the object file; and a second sending module 1004, configured to send the processed file to the client.

In a possible implementation, the storage module 1001 is configured to receive and store the object file uploaded by a first client or a second client.

Figure 11:
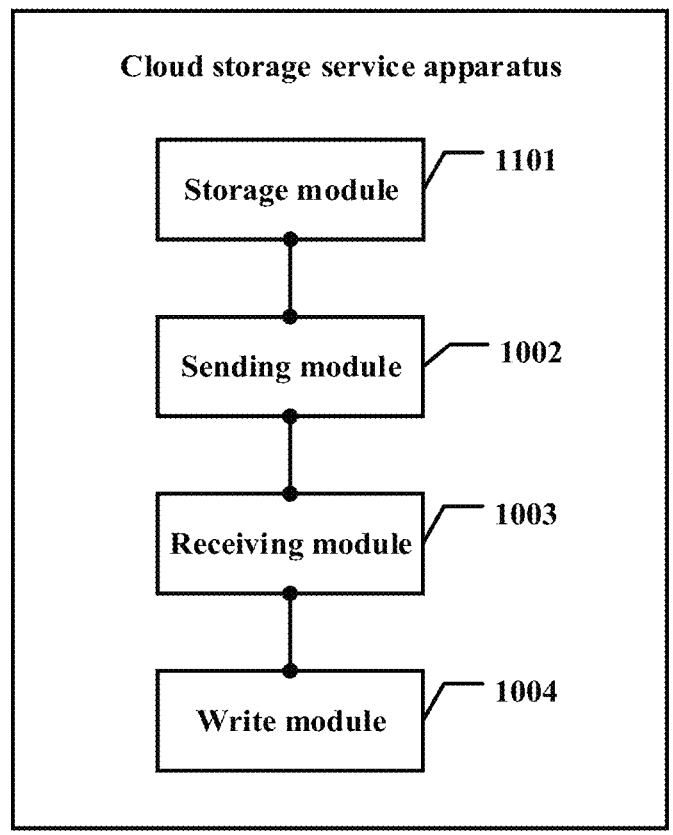
FIG. 11 is another schematic diagram of a structure of a cloud storage service apparatus according to an embodiment of this disclosure.

FIG. 11 is another schematic diagram of a structure of a cloud storage service apparatus according to an embodiment of this disclosure. As shown in FIG. 11, the apparatus includes a storage module 1101, configured to store an object file, and provide a file update interface, where the file download interface is configured to receive a write request and an objective function that are for the object file and that are sent by a client, and the objective function is data processing logic defined by a tenant for the object file; a sending module 1102, configured to send to-be-written data carried in the write request and the objective function to a cloud function service apparatus; a receiving module 1103, configured to receive the cloud function service apparatus sent by the cloud function service apparatus, and run the objective function, to process, based on the data processing logic, processed data generated by the to-be-written data; and a write module 1104, configured to write the processed data into the object file.

In a possible implementation, the storage module 1101 is configured to receive and store the object file uploaded by a first client or a second client.

Figure 12:
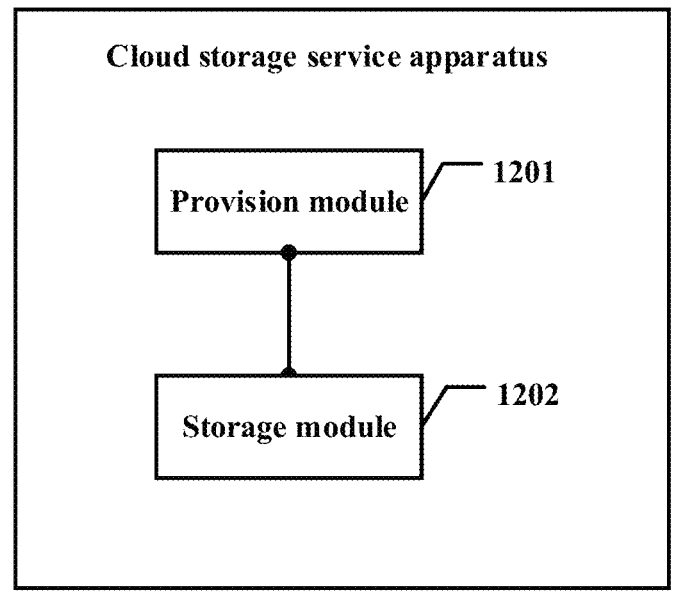
FIG. 12 is another schematic diagram of a structure of a cloud storage service apparatus according to an embodiment of this disclosure.

FIG. 12 is another schematic diagram of a structure of a cloud storage service apparatus according to an embodiment of this disclosure. As shown in FIG. 12, the apparatus includes a provision module 1201, configured to provide a file upload interface, where the file upload interface is configured to receive an upload request and an objective function that are for an object file and that are sent by a client, and the objective function is data processing logic defined by a tenant for the object file; and a storage module 1202, configured to store the object file, and send the objective function to a cloud function service apparatus.

In a possible implementation, the storage module 1202 is configured to receive and store the object file uploaded by a first client or a second client.

It should be noted that content such as information exchange between the modules/units of the apparatus and the implementation processes thereof is based on the same idea as that of the method embodiments of this disclosure, and produces the same technical effects as that of the method embodiments of this disclosure. Refer to the descriptions in the method embodiments of embodiments of this disclosure. Details are not described herein again.

Figure 13:
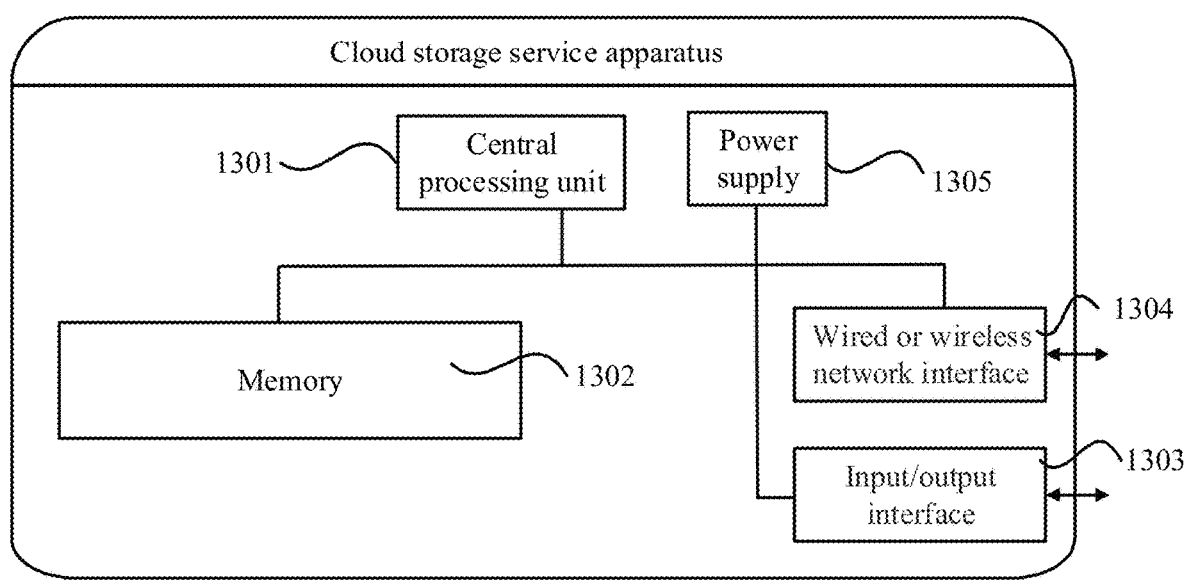
FIG. 13 is another schematic diagram of a structure of a cloud storage service apparatus according to an embodiment of this disclosure.

FIG. 13 is another schematic diagram of a structure of a cloud storage service apparatus according to an embodiment of this disclosure. As shown in FIG. 13, an embodiment of a public cloud system may include one or more central processing units 1301, a memory 1302, an input/output interface 1303, a wired or wireless network interface 1304, and a power supply 1305.

The memory 1302 may be transient storage or persistent storage. Further, the central processing unit 1301 may be configured to communicate with the memory 1302, and perform, on the public cloud system, a series of instruction operations in the memory 1302.

In this embodiment, the central processing unit 1301 may perform the operations performed by the cloud storage service apparatus in the embodiment shown in FIG. 5, FIG. 7, FIG. 8, or FIG. 9. Details are not described herein again.

In this embodiment, division of functional modules in the central processing unit 1301 may be similar to a module division manner of the cloud storage service apparatus described in FIG. 10, FIG. 11, or FIG. 12. Details are not described herein again.

An embodiment of this disclosure further relates to a computer storage medium, including computer-readable instructions. When the computer-readable instructions are executed, the steps performed by the cloud management platform and the cloud storage service apparatus in the embodiment shown in FIG. 5, FIG. 7, FIG. 8, or FIG. 9 are implemented.

An embodiment of this disclosure further relates to a computer program product including instructions. When the computer program product is run on a computer, the computer is enabled to perform the steps performed by the cloud management platform and the cloud storage service apparatus in the embodiment shown in FIG. 5, FIG. 7, FIG. 8, or FIG. 9.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this disclosure, it should be understood that the disclosed systems, apparatuses, and methods may be implemented in other manners. For example, the described apparatus embodiments are merely examples. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be indirect couplings or communication connections through some interfaces, apparatuses or units, and may be implemented in electrical, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of embodiments.

In addition, functional units in embodiments of this disclosure may be integrated into one processing unit, or each of the units may exist alone physically, or two or more units are integrated into one unit. The integrated unit may be implemented in a form of hardware, or may be implemented in a form of software functional unit.

When the integrated unit is implemented in the form of software functional unit and sold or used as an independent product, the integrated unit may be stored in a computer-readable storage medium. Based on such an understanding, the technical solutions may be implemented in the form of software product. The computer software product is stored in a storage medium and includes several instructions for instructing a computer device (which may be a personal computer, a server, a network device, or the like) to perform all or some of the steps of the methods described in embodiments of this disclosure. The storage medium includes any medium that can store program code, such as a USB flash drive, a removable hard disk, a read-only memory (ROM), a random-access memory (RAM), a magnetic disk, or an optical disc.

What is claimed is:

1. A public cloud system comprising:
   a cloud storage service apparatus configured to:
      store an object file;
      receive a download request for the object file from a first client;
      send the object file;
      receive a processed file based on the object file; and
      send the processed file to the first client; and
   a cloud function service apparatus configured to:
      obtain a first objective function, wherein the first objective function comprises a first data processing logic from a tenant for the object file;
      receive the object file from the cloud storage service apparatus;
      generate, using the first data processing logic, the processed file based on the object file; and
      return the processed file to the cloud storage service apparatus.

2. The public cloud system according to claim 1, wherein the first data processing logic comprises a data encryption logic, a data decryption logic, a data compression logic, a data decompression logic, a data format conversion logic, a data content transformation logic, or a data filtering logic.

3. The public cloud system according to claim 1, wherein the cloud storage service apparatus is further configured to:
receive the object file from the first client or a second client; and
store the object file.

4. The public cloud system according to claim 3, wherein the tenant is a first tenant or a second tenant, and wherein the public cloud system further comprises a cloud management platform configured to:
obtain, using a registration interface, a first account and a first password from the first tenant; and
obtain, using the registration interface, a second account and a second password from the second tenant;
register the first tenant based on the first account and the first password to allow the first client to communicate with a storage service and the cloud function service apparatus; and
register the second tenant based on the second account and the second password to allow the second client to communicate with the storage service and the cloud function service apparatus.

5. The public cloud system according to claim 1, wherein the cloud storage service apparatus is further configured to:
receive a write request for the object file from the first client or a second client, wherein the write request comprises to-be-written data;
send the to-be-written data to the cloud function service apparatus;
receive, from the cloud function service apparatus, processed data based on the to-be-written data; and
write the processed data into the object file, and
wherein the cloud function service apparatus is further configured to:
obtain a second objective function, wherein the second objective function comprises a second data processing logic from the tenant for the object file;
receive the to-be-written data from the cloud storage service apparatus;
generate, using the second data processing logic, the processed data based on the to-be-written data; and
return the processed data to the cloud storage service apparatus.

6. A public cloud system comprising:
a cloud storage service apparatus configured to:
store an object file;
receive a write request for the object file from a first client, wherein the write request comprises to-be-written data;
send the to-be-written data;
receive processed data based on the to-be-written data; and
write the processed data into the object file; and
a cloud function service apparatus configured to:
obtain a first objective function, wherein the first objective function comprises a first data processing logic from a tenant for the object file;
receive the to-be-written data from the cloud storage service apparatus;
generate, using the first data processing logic, the processed data based on the to-be-written data; and
return the processed data to the cloud storage service apparatus.

7. The public cloud system according to claim 6, wherein the first data processing logic comprises a data encryption logic, a data decryption logic, a data compression logic, a data decompression logic, a data format conversion logic, a data content transformation logic, or a data filtering logic.

8. The public cloud system according to claim 6, wherein the cloud storage service apparatus is further configured to:
receive the object file from the first client or a second client; and
store the object file.

9. The public cloud system according to claim 8, further comprising: a cloud management platform configured to:
obtain, using a registration interface, a first account and a first password from a first tenant; and
obtain, using the registration interface, a second account and a second password from a second tenant;
register the first tenant based on the first account and the first password to allow the first client to communicate with a storage service and the cloud function service apparatus; and
register the second tenant based on the second account and the second password to allow the second client to communicate with the storage service and the cloud function service apparatus.

10. The public cloud system according to claim 6, wherein the cloud storage service apparatus is further configured to:
receive a download request for the object file from the first client or a second client;
send the object file to the cloud function service apparatus;
receive, from the cloud function service apparatus, a processed file based on the object file; and
send the processed file to the first client or the second client, and
wherein the cloud function service apparatus is further configured to:
obtain a second objective function, wherein the second objective function comprises a second data processing logic from the tenant for the object file;
receive the object file from the cloud storage service apparatus;
generate, using the second data processing logic, the processed file based on the object file; and
return the processed file to the cloud storage service apparatus.

11. A file download method based comprising:
storing, at a cloud storage service apparatus, a first object file;
receiving, at the cloud storage service apparatus using a file download interface, a download request and a first objective function for the first object file from a first client, wherein the first objective function comprises a first data processing logic from a tenant for the first object file;
sending, from the cloud storage service apparatus, the first object file and the first objective function to a cloud function service apparatus;
generating, at the cloud function service apparatus using the first data processing logic, a processed file based on the first object file;
sending, to the cloud storage service apparatus, the processed file from the cloud function service apparatus; and
sending, from the cloud storage service apparatus, the processed file to the first client.

12. The method according to claim 11, further comprising:
storing, at the cloud storage service apparatus, a second object file;

receiving, at the cloud storage service apparatus using a file update interface, a write request and a second objective function for the second object file from the first client, wherein the write request comprises to-be-written data; and wherein the second objective function comprises a second data processing logic from the tenant for the second object file;

sending, from the cloud storage service apparatus, the to-be-written data and the second objective function to the cloud function service apparatus;

generating, at the cloud function service apparatus using the second data processing logic, processed data based on the second object file;

sending, to the cloud storage service apparatus, the processed data from the cloud function service apparatus; and writing, at the cloud storage service apparatus, the processed data into the second object file.

13. The method according to claim 11, further comprising:

receiving, at the cloud storage service apparatus using a file upload interface, an upload request and a third objective function for a third object file from the first client, wherein the third objective function comprises a third data processing logic from the tenant for the third object file;

storing, at the cloud storage service apparatus, the third object file; and sending the third objective function to the cloud function service apparatus.

14. The method according to claim 11, further comprising:

receiving the first object file from the first client or a second client;

obtaining, at a cloud management platform using a registration interface, a first account and a first password from a first tenant;

obtaining, using the registration interface, a second account and a second password from a second tenant;

registering the first tenant based on the first account and the first password to allow the first client to communicate with a storage service and the cloud function service apparatus; and registering the second tenant based on the second account and the second password to allow the second client to communicate with the storage service and the cloud function service apparatus.

15. The method according to claim 11, further comprising:

sending, from the cloud function service apparatus, a first Internet protocol (IP) address of the cloud function service apparatus and a first port of the cloud function service apparatus to the cloud storage service apparatus;

establishing, at the cloud storage service apparatus, a target channel with the cloud function service apparatus based on the first IP address and the first port; and sending, from the cloud storage service apparatus, the first object file to the cloud function service apparatus over the target channel.

16. The method according to claim 15, further comprising:

generating, at the cloud storage service apparatus, a call request based on the download request, wherein the call request indicates the first objective function;

sending, from the cloud storage service apparatus, a call request to the cloud function service apparatus; and sending, from the cloud storage service apparatus in response to the call request, a call response, wherein the call response indicates the first IP address and the first port.

17. A cloud storage service apparatus comprising:

a memory configured to store instructions; and at least one processor coupled to the memory and configured to execute the instructions to cause the cloud storage service apparatus to:

store a first object file;

receive, using a file download interface, a download request and a first objective function for the first object file from a client, wherein the first objective function comprises a first data processing logic from a tenant for the first object file;

send the first object file and the first objective function to a cloud function service apparatus;

receive a processed file from the cloud function service apparatus, wherein the processed file is based on the first data processing logic and the first object file; and send the processed file to the client.

18. The cloud storage service apparatus according to claim 17, wherein the at least one processor is further configured to execute the instructions to cause the cloud storage service apparatus to:

store a second object file;

receive, using a file update interface, a write request and a second objective function for the second object file from the client, wherein the write request comprises to-be-written data; and wherein the second objective function comprises a second data processing logic from the tenant for the second object file;

send the to-be-written data and the second objective function to the cloud function service apparatus;

receive processed data from the cloud function service apparatus, wherein the processed data is based on the second data processing logic and the to-be-written data; and write the processed data into the second object file.

19. The cloud storage service apparatus according to claim 17, wherein the at least one processor is further configured to execute the instructions to cause the cloud storage service apparatus to:

receive, using a file upload interface, an upload request and a third objective function for a third object file from the client, wherein the third objective function comprises a third data processing logic from the tenant for the third object file;

store the third object file; and send the third objective function to the cloud function service apparatus.

20. The cloud storage service apparatus according to claim 17, wherein the first data processing logic comprises a data encryption logic, a data decryption logic, a data compression logic, a data decompression logic, a data format conversion logic, a data content transformation logic, or a data filtering logic.

* * * * *